United States Patent
Takahashi et al.

(10) Patent No.: US 8,330,414 B2
(45) Date of Patent: Dec. 11, 2012

(54) CONTACTLESS BATTERY CHARGER, ELECTRONIC DEVICE, BATTERY PACK, AND CONTACTLESS CHARGING SYSTEM

(75) Inventors: Hiroyuki Takahashi, Kanagawa (JP);
Hiroyuki Oku, Kanagawa (JP);
Masanori Oshimi, Tokyo (JP)

(73) Assignee: Panasonic Corporation, Osaka (JP)

( * ) Notice: Subject to any disclaimer, the term of this patent is extended or adjusted under 35 U.S.C. 154(b) by 325 days.

(21) Appl. No.: 12/513,145

(22) PCT Filed: Nov. 8, 2006

(86) PCT No.: PCT/JP2006/322307
§ 371 (c)(1),
(2), (4) Date: Apr. 30, 2009

(87) PCT Pub. No.: WO2008/056415
PCT Pub. Date: May 15, 2008

(65) Prior Publication Data
US 2010/0066305 A1   Mar. 18, 2010

(51) Int. Cl.
*H02J 7/00* (2006.01)
(52) U.S. Cl. ............ 320/108; 320/131; 336/155; 363/75
(58) Field of Classification Search .................. 320/108, 320/131; 336/155; 363/75–147
See application file for complete search history.

(56) References Cited

U.S. PATENT DOCUMENTS

| | | | |
|---|---|---|---|
| 5,115,182 A * | 5/1992 | Ehmke et al. | 320/136 |
| 6,118,249 A * | 9/2000 | Brockmann et al. | 320/108 |
| 6,931,332 B2 * | 8/2005 | Phansalkar et al. | 702/63 |
| 2002/0110013 A1 | 8/2002 | Park et al. | |
| 2005/0258800 A1 * | 11/2005 | Aradachi et al. | 320/107 |
| 2007/0069687 A1 * | 3/2007 | Suzuki | 320/108 |
| 2008/0061733 A1 | 3/2008 | Toya | |

FOREIGN PATENT DOCUMENTS

| | | |
|---|---|---|
| JP | 2000-60010 A | 2/2000 |
| JP | 2000-090220 A | 3/2000 |
| JP | 2002-262468 A | 9/2002 |
| JP | 2005-143181 A | 6/2005 |
| JP | 2006-115562 A | 4/2006 |
| JP | 2006-141170 A | 6/2006 |
| JP | 2006141170 A * | 6/2006 |
| JP | 2006-230032 A | 8/2006 |
| JP | 2008-048482 A | 2/2008 |

OTHER PUBLICATIONS

Extended European Search Report, dated Jul. 23, 2012, for corresponding European Application No. 06823211.5, 7 pages.

* cited by examiner

*Primary Examiner* — Huy Q Phan
*Assistant Examiner* — Temilade S Rhodes-Vivour
(74) *Attorney, Agent, or Firm* — Seed IP Law Group PLLC

(57) ABSTRACT

A contactless charging system is made up of an electronic device and a contactless charger 200 that recharges the electronic device in a contactless manner. The electronic device transmits a full charge command indicating completion of charge. Upon receipt of the full charge command, the contactless charger shifts to a charge stop state in which charge of the electronic device is not performed. In the charge stop state, the contactless charger generates a load check signal for checking whether or not the electronic device is placed in the contactless charger in a rechargeable state, and transmits the signal. Further, the contactless charger also generates a charge restart check command for checking whether or not the electronic device requests recharge in a charge stop state, and transmits the command.

12 Claims, 15 Drawing Sheets

CONTACTLESS BATTERY CHARGER, ELECTRONIC DEVICE, BATTERY PACK, AND CONTACTLESS CHARGING SYSTEM

TECHNICAL FIELD

The present invention relates to a contactless charging system that recharges an electronic device with electric power supplied from a charger, the electronic device, a contactless charger, and a battery pack for the electronic device.

BACKGROUND ART

In order to assure a power source for a portable electronic device, such as a mobile phone, a secondary battery that enables performance of repetitive charge-discharge operations is used in the electronic device. A contactless charging system that enables recharging of the secondary battery without contacting the electronic device has been conceived as a system for recharging the secondary battery.

Such a contactless charging system has become prevalent primarily among devices, charging terminals of which are desired to avoid exposure, such as an electric shaver. Future proliferation of the contactless charging system in a device, such as a mobile phone, is conceived. Patent Documents 1 and 2 describe; for instance, a mobile phone adopting a contactless charging system.

In the event of occurrence of an anomaly in a secondary battery or an electronic device subjected to recharge or when these loads are not regular articles, an overcurrent or heating may arise. For these reasons, a contactless charging system that determines whether or not the load is a regular article is required. For instance, Patent Document 3 describes a power transmission apparatus that detects a change in the phase and amplitude value of a primary (charging) voltage attributable to a change in a secondary load (an object to be recharged) and that determines whether or not the load is a regular article.
Patent Document 1: JP-A-2005-143181
Patent Document 2: JP-A-2006-115562
Patent Document 3: JP-A-2006-230032

DISCLOSURE OF THE INVENTION

Problem that the Invention is to Solve

As of now, in connection with such a contactless charging system, there is an increasing demand for minimizing power consumption of a contactless charger after completed recharging operation and preventing generation of heat as a safety measure. Moreover, when a decrease arises in battery voltage of an electronic device as a result of the electronic device having been left as it is after once finished becoming recharged, it is preferable to resume a recharge.

The present invention has been conceived in view of the circumstances and aims at providing a battery back, an electronic device, and a contactless recharging system that provide excellent usability, prevent power consumption, and allow for a safety measure.

Means for Solving the Problem

A first aspect of the present invention provides a contactless charger for charging, in a contactless manner, an electronic device using a secondary battery as a power source, the charger including a transceiving section that receives from the electronic device a full charge command indicating completion of recharge and a control section that shifts, upon receipt of the full charge command, the contactless charger to a charge stop state in which charge of the electronic device is not performed, wherein the control section generates, in a charge stop state, a load check signal for checking whether or not the electronic device is placed on the contactless charger in a rechargeable manner, and the transceiving section sends the load check signal.

With this configuration, the contactless charger can determine the placement state of the electronic device and shift to an appropriate state according to a determination result.

A second aspect of the present invention provides the contactless charger defined in claim 1, wherein, when it is ascertained by the load check signal that the electronic device is placed, the control section maintains the contactless charger in a charge stop state; and, when it is ascertained by the load check signal that the electronic device is not placed, the control section shifts the contactless charger to an initial state achieved immediately after activation of a power source.

With this configuration, the contactless charger can determine the placement state of the electronic device and shift to an appropriate state according to a determination result. Hence, it is possible to reduce power consumption and take a safety measure.

A third aspect of the present invention is directed toward the contactless charger defined in claim 1, wherein the control section further generates, in a charge stop state, a charge restart check command for checking whether or not the electronic device requires recharge, and the transceiving section transmits the charge restart check command.

With this configuration, the contactless charger can determine the recharge state of the electronic device and shift to an appropriate state according to a determination result.

A fourth aspect of the present invention provides the contactless charger defined in claim 3, wherein the control section intermittently generates the load check signal and the charge restart check command, and time intervals at which the charge restart check command is generated are larger than time intervals at which the load check signal is generated.

With this configuration, the contactless charger can reduce the number of times a charge restart check command is transmitted, and power consumption can be reduced.

A fifth aspect of the present invention provides the contactless charger defined in claim 4, wherein the transceiving section is made up of a coil that transmits power for recharging the electronic device; and the contactless charger further includes a modulation section that superimposes the load check signal and the charge restart check command on power and that modulates the power.

With this configuration, the contactless charger can readily transmit a command.

A sixth aspect of the present invention provides the contactless charger defined in claim 3, wherein the transceiving section is made up of a coil that transmits power for recharging the electronic device; and the control section determines, from a phase change in an electric current developing in the coil, that the electronic device is placed.

With this configuration, the contactless charger can readily determine the placement state of the electronic device.

A seventh aspect of the present invention provides the contactless charger defined in claim 3, wherein, when the transceiving section receives, in response to the charge restart check command, a recharge command indicating that the electronic device requests recharge, the control section shifts the contactless charger to a power transfer state; and, when the transceiving section does not receive the recharge command in response to the charge restart check command, the control section holds the contactless charger in a charge stop state.

With this configuration, the contactless charger can determine the charge state of the electronic device and shift to an appropriate state in accordance with a determination result.

An eighth aspect of the present invention provides the contactless charger defined in claim 7, wherein the transceiving section is made up of a coil for transmitting power for charging the electronic device, and the control section determines the full charge command and the recharge command from a phase change in an electric current developing in the coil.

With this configuration, the contactless charger can readily determine a command.

A ninth aspect of the present invention provides an electronic device that uses as a power source a secondary battery which can be charged by a contactless charger for effecting charging in a contactless manner, the device comprising: a control section that generates a full charge command indicating that the contactless charger is shifted to a charge stop state in which charging of the electronic device is not performed, in response to completion of charge of the secondary battery; and a transceiving section for transmitting the full charge command to the contactless charger, wherein, when the transceiving section receives from the contactless charger, in a charge stop state, a charge restart check command for checking whether or not the electronic device requests recharge, the control section checks whether or not the secondary battery requests recharge; and, when the recharge is requested, the control section generates a recharge command indicating a request for recharge, and the transceiving section transmits the recharge command to the contactless charger.

With this configuration, the electronic device can report a recharge state to the contactless charger and shift the contactless charger town appropriate state.

A tenth aspect of the present invention can provide the electronic device defined in claim 9, wherein the transceiving section is made up of a coil that receives from the contactless charger power for charging the secondary battery; and the electronic device further includes a modulation section that superimposes the full charge command and the recharge command on an electric current generated by the electronic device and that modulates the electric current.

With this configuration, the contactless charger can readily transmit a command.

An eleventh aspect of the present invention provides the electronic device defined in claim 10, wherein the modulation section differentiates the full charge command and the recharge command in terms of a difference in data sequence.

With this configuration, the contactless charger can readily transmit a different command.

A twelfth aspect of the present invention provides a battery pack attachable to an electronic device that uses, as a power source, a secondary battery which can be charged by a contactless charger for effecting charge in a contactless fashion, wherein the electronic device has a control section that generates, in response to completion of charge of the secondary battery, a full charge command indicating that the contactless charger is shifted to a charge stop state in which the electronic device is not charged; and the battery pack has the secondary battery, a protective circuit for protecting the secondary battery, and a coil for transmitting the full charge command to the contactless charger.

A thirteenth aspect of the present invention provides a battery pack attachable to an electronic device that uses, as a power source, a secondary battery which can be charged by a contactless charger for effecting charge in a contactless fashion, the pack comprising: the secondary battery; a control section that generates, in response to completion of charge of the secondary battery, a full charge command indicating that the contactless charger is shifted to a charge stop state in which the electronic device is not charged; and a transceiving section that transmits the full charge command to the contactless charger.

The twelfth and thirteenth battery packs are objects that are independently traded separately from a mobile phone or an electronic device.

A fourteenth aspect of the present invention provides an electronic device that allows attachment of the battery pack.

A fifteenth aspect of the present invention provides a contactless charging system including an electronic device and a contactless charger for charging the electronic device in a contactless fashion, wherein a full charge command indicating that charge of the electronic device is completed is transmitted; the contactless charger shifts to a charge stop state in which charge of the electronic device is not performed, upon receipt of the full charge command; the contactless charger generates, in a charge stop state, a load check signal for checking whether or not the electronic device is placed on the contactless charger in a state where the electronic device can be recharged, and transmits the load check signal; and the contactless charger further generates, in a charge stop state, a charge restart check command for checking whether or not the electronic device requests recharge, and transmits the command.

Advantage of the Invention

According to the present invention, the contactless charging system enables a reduction in power consumed by the contactless charger after completion of charge, and can also incorporate a safety measure for preventing generation of heat, which would otherwise be caused after completion of charge. Further, recharge is voluntarily performed at the time of a decrease in the voltage of a secondary battery; hence, usability of the contactless charging system can be further enhanced.

DESCRIPTIONS OF THE REFERENCE NUMERALS

10 AC POWER SOURCE
100 MOBILE PHONE
110 MAIN CONTROL SECTION
120 ALARM SECTION DRIVER CIRCUIT
130 ALARM SECTION
140 RECHARGING CIRCUIT
150 PROTECTIVE CIRCUIT
160 BATTERY CELL
170 CONTACTLESS RECHARGING CIRCUIT
171 CONTROL SECTION
172 AUTHENTICATION SECTION
173 MODULATION SECTION
174 DEMODULATION SECTION
175 SWITCHING CIRCUIT
176 RECTIFYING CIRCUIT
177 COIL
178 VOLTAGE DETECTION CIRCUIT
179 DETERMINATION CIRCUIT
200 CONTACTLESS CHARGER
210 ALARM SECTION
220 ALARM SECTION DRIVER CIRCUIT
230 CONTROL SECTION
240 MODULATION SECTION
250 AUTHENTICATION SECTION
260 DEMODULATION SECTION
270 COIL DRIVER CIRCUIT
280 COIL
300 AC ADAPTOR
310 POWER CABLE

BEST MODES FOR IMPLEMENTING THE INVENTION

A battery pack, an electronic device, a contactless charger, and a contactless charging system of embodiments of the present invention will be described hereinbelow by reference to the drawings. In the following embodiments, a mobile phone is described as an example of the electronic device. However, the electronic device of the present invention includes various electronic devices that use, as a power source, a secondary battery which can be repeatedly utilized by recharge, such as a portable information terminal (PDA: Personal Digital Assistant).

First Embodiment

Figure 1:
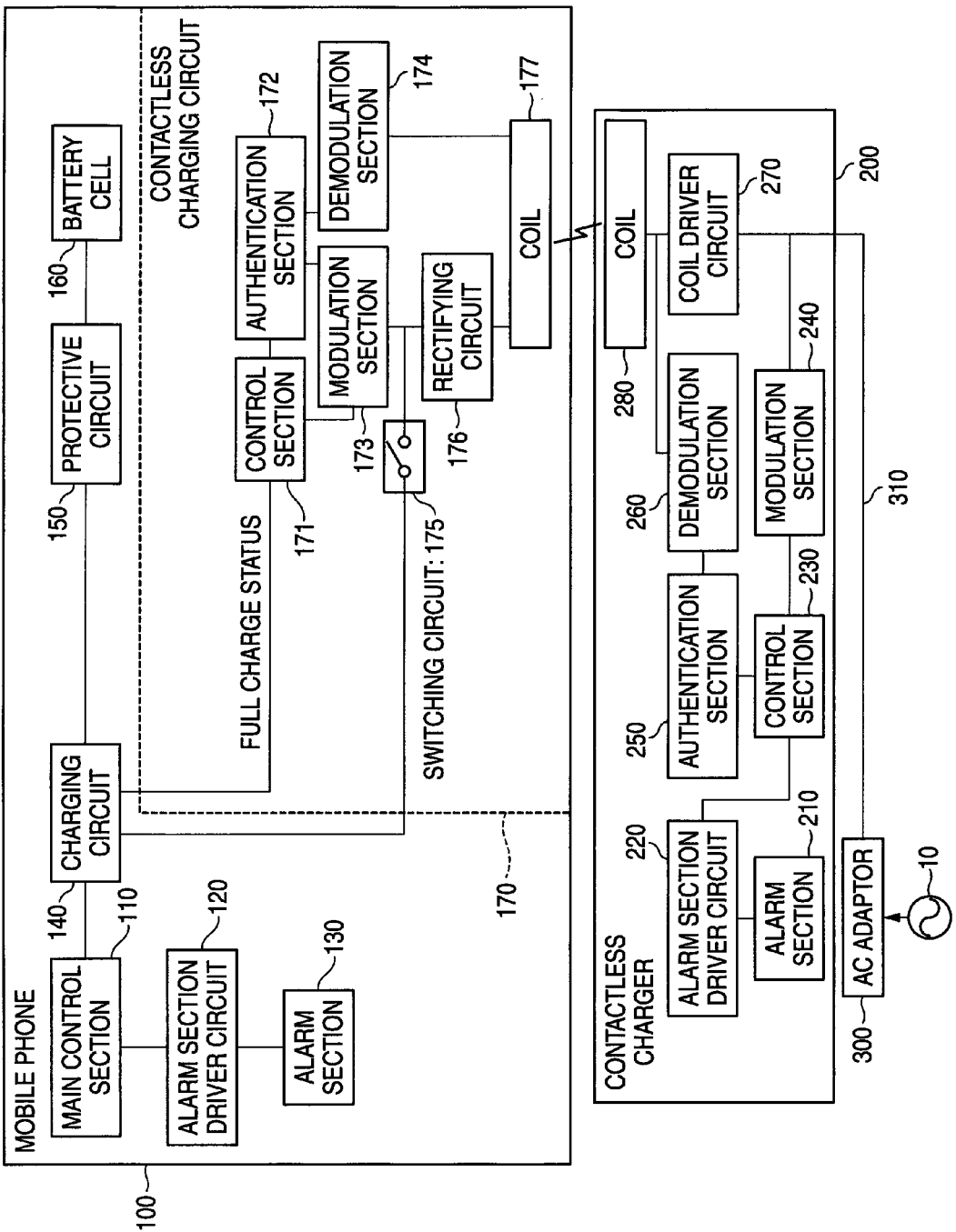
FIG. 1 is a block diagram for describing an overview of a contactless charging system of a first embodiment of the present invention.

FIG. 1 is a block diagram for describing an overview of a contactless charging system of a first embodiment of the present invention. As shown in FIG. 1, the contactless charging system of the present embodiment is made up of a mobile phone 100, a contactless charger 200, and an AC adaptor 300. The mobile phone 100 is supplied with electric power while remaining out of contact with the contactless charger 200 and can recharge a battery cell (a secondary battery) 160 to be described later. Here, the term "contactless" means that the mobile phone 100 and the contactless charger 200 can exchange electric power (an electric wave), a signal, and the like, while they are not in direct, electrical conduction with each other by way of their metal terminals.

The mobile phone 100 has a main control section 110, an alarm section driver circuit 120, an alarm section 130, a charging circuit 140, a protective circuit 150, a battery cell 160, and a contactless charging circuit 170. The main control section 110 controls overall operation of the mobile phone 100; is made up of various arithmetic processing circuits that operate in accordance with predetermined programs; monitors a state of the charging circuit 140; and controls the alarm section driver circuit 120.

Electric power from the contactless charging circuit 170 is input to the charging circuit 140 and controls charging of the battery cell 160 by way of the protective circuit 150. Further, the charging circuit 140 reports a charge status of the battery cell 160, or the like, to the main control section 110.

The protective circuit 150 supplies the battery cell 160 with the electric power received from the charging circuit 140, thereby charging the battery cell. Further, the protective circuit 150 has a temperature sensor and an overcurrent sensor and monitors the state of charge of the battery cell 160. When having determined occurrence of an anomaly by detecting a high temperature or an overcurrent, the protective circuit stops charge of the battery cell 160, thereby protecting the battery cell 160. An anomaly detection signal achieved at the time of detection of an anomaly is output to the main control section 110 by way of the charging circuit 140 and sent to the user by way of the alarm section 130.

The battery cell 160 functions as an example secondary battery that can be recharged by way of the protective circuit 150 and undergo repetitive charges and discharges.

The alarm section driver circuit 120 is a circuit that drives the alarm section 130 under control of the main control section 110. The alarm section 130 is a section that sends a predetermined alarm signal to the user by a drive signal of the alarm section driver circuit 120 and that is made up of a buzzer, a vibrator, and a light-emitting section, such as an LED (light-emitting diode).

As shown in FIG. 1, the contactless charging circuit 170 has a control section 171, an authentication section 172, a modulation section 173, a demodulation section 174, a switching circuit 175, a rectifying circuit 176, and a coil 177, and serves as a principal section that performs operation for effecting contactless charge of the mobile phone 100. The contactless charging circuit 170 can be configured so as to be readily removed, as a single module, from a main unit of the mobile phone 100.

The coil 177 works as a secondary coil that is electromagnetically coupled to a coil 280 provided in a contactless charger 200, to thus be supplied with electric power, and outputs supplied AC power to the rectifying circuit 176 and the demodulation section 174. Moreover, the coil 177 is electromagnetically coupled to the coil 280, thereby transmitting a command.

The rectifying circuit 176 converts AC power output from the coil 177 into DC power and output the DC power to the switching circuit 175 and the modulation section 173. The switching circuit 175 switches whether (ON) or not (OFF) to output the DC power output from the rectifying circuit 176 to the charging circuit 140. Switching is performed in accordance with a command from the control section 171 as will be described later.

The demodulation section 174 receives AC power from the coil 177 supplied with the AC power from the coil 280 of the contactless charger 200. As will be described later, an AC wave of the AC power serves as a carrier wave (carrier) for carrying a digital signal, and the demodulation section 174 extracts and decodes the digital signal and outputs the thus-decoded signal to the authentication section 172.

In accordance with the command from the control section 171, the authentication section 172 establishes communication with the contactless charger 200 by way of the coil 177, and determines and authenticates a command responsive to the digital signal included in electric power supplied from the contactless charger 200. A result of authentication is reported to the control section 171.

The control section 171 is built from various arithmetic processing circuits that operate in accordance with predetermined programs, as is the main control section 110; and controls operation of the contactless charging circuit 170 and generates various commands to be described later. The control section 171 performs various control operations relevant to operation of the contactless charging circuit 170, such as analysis of authentication results that have been acquired by the authentication section 172 and that are responsive to various commands transmitted from the contactless charger 200, receipt of a full charge status showing that charge of the battery cell 160 performed by the charging circuit 140 is completed, and ON-OFF control of the switching circuit 175.

In accordance with an authentication signal from the authentication section 172, the modulation section 173 transmits a digital signal corresponding to a predetermined command generated by the control section 171 to the coil 280 of the contactless charger 200 by load modulation to be described later.

The contactless charger 200 has an alarm section 210, an alarm driver circuit 220, a control section 230, a modulation section 240, an authentication section 250, a demodulation section 260, a coil driver circuit 270, a coil 280. The contactless charger 200 assumes various shapes, such as a desktop-type charger and an inbuilt charger that is built in a table of an eating place like a restaurant, a bench like a park bench, a guardrail for a vehicle like a railway, a center console for an automobile or the like, and a handrail of an escalator. In general, a circuit is built and formed in a plastic housing. The contactless charger 200 receives a power supply from the AC power source 10 by way of an AC adaptor 300. The mobile phone 100 can be recharged as a result of the mobile phone 100 being placed on the contactless charger 200.

The alarm section 210 and the alarm section driver circuit 220 are functionally equivalent to the alarm section 130 and the alarm section driver circuit 120 of the mobile phone 100. The control section 230 controls overall operation of the contactless charger 200 and is built from various arithmetic processing circuits that operate in accordance with predetermined programs. The control section 230 generates various commands to be described later.

The modulation section 240 superimposes on a carrier wave a digital signal corresponding to any of various commands generated by the control section 230, and modulates the thus-superimposed signal. The coil driver circuit 270 drives the coil 280 for transmitting the modulated carrier wave.

The coil 280 functions as a primary coil that is electromagnetically coupled to the coil 177 provided in the mobile phone 100, to thus transmit electric power. In this case, the coil 280 transmits an AC wave originating from the coil driver circuit 270 to the coil 177. The coil 280 is electromagnetically coupled to the coil 177, thereby outputting a command to the identification section 250 by way of the demodulation section 260. Specifically, the coil 280 functions as a transceiving section that transmits and receives electric power and various commands and signals to be described later.

The demodulation section 260 receives an AC current from the coil 280 that is supplied with a signal from the coil 177 of the mobile phone 100 and that generates an AC current from the signal. As will be described later, an AC wave of the AC current works as a carrier wave (a carrier) that carries a digital signal, and the demodulation section 260 extracts and decodes the digital signal and output the thus-decoded signal to the authentication section 250.

The authentication section 250 determines and authenticates a command corresponding to the digital signal acquired by the demodulation section 260. A result of authentication is reported to the control section 230.

The AC adaptor 300 is connected to the AC power source 10; converts AC power to DC power; and outputs the DC power to the coil driver circuit 270 by way of a power cable 310. In the drawing, the AC adaptor 300 is provided in a housing separate from the contactless charger 300; however, the AC adaptor 300 may also be provided in the contactless charger 200 as one circuit.

In the contactless charging system of the present embodiment, electric power is supplied from the contactless charger 200 to the mobile phone 100 along the following path.

The AC power source 10→the AC adaptor 300→the power source cable 310→the coil driver circuit 270→coil 280→the coil 177→the rectifying circuit 176→the switching circuit 175→the charging circuit 140→the protective circuit 150→the battery cell 160

In the meantime, in the contactless charging system of the present embodiment, various commands are exchanged between the mobile phone 100 and the contactless charger 200 by a digital signal. For instance, a full charge command indicating completion of charge of the battery cell 160 of the mobile phone 100 is transmitted, as one of such commands, from the mobile phone 100 to the contactless charger 200 along the following path.

The charging circuit 140→control section 171→the authentication section 172→the modulation section 173→the rectifying circuit 176→the coil 177→the coil 280→the demodulation section 260→the authentication section 250→the control section 230

As mentioned above, in the contactless charging system of the present embodiment, power and a command are transmitted by way of the rectifying circuit 176 and the coil 280 that are common transmission channels. In the present embodiment, an AC wave of AC power to be transmitted is taken as a carrier wave; a command stemming from a digital signal is superimposed on the carrier wave; and the carrier wave is transmitted. In the present embodiment, the electric power is transmitted from the contactless charger 200 to the mobile phone 100 but not transmitted from the mobile phone 100 to the contactless charger 200.

Figure 2:
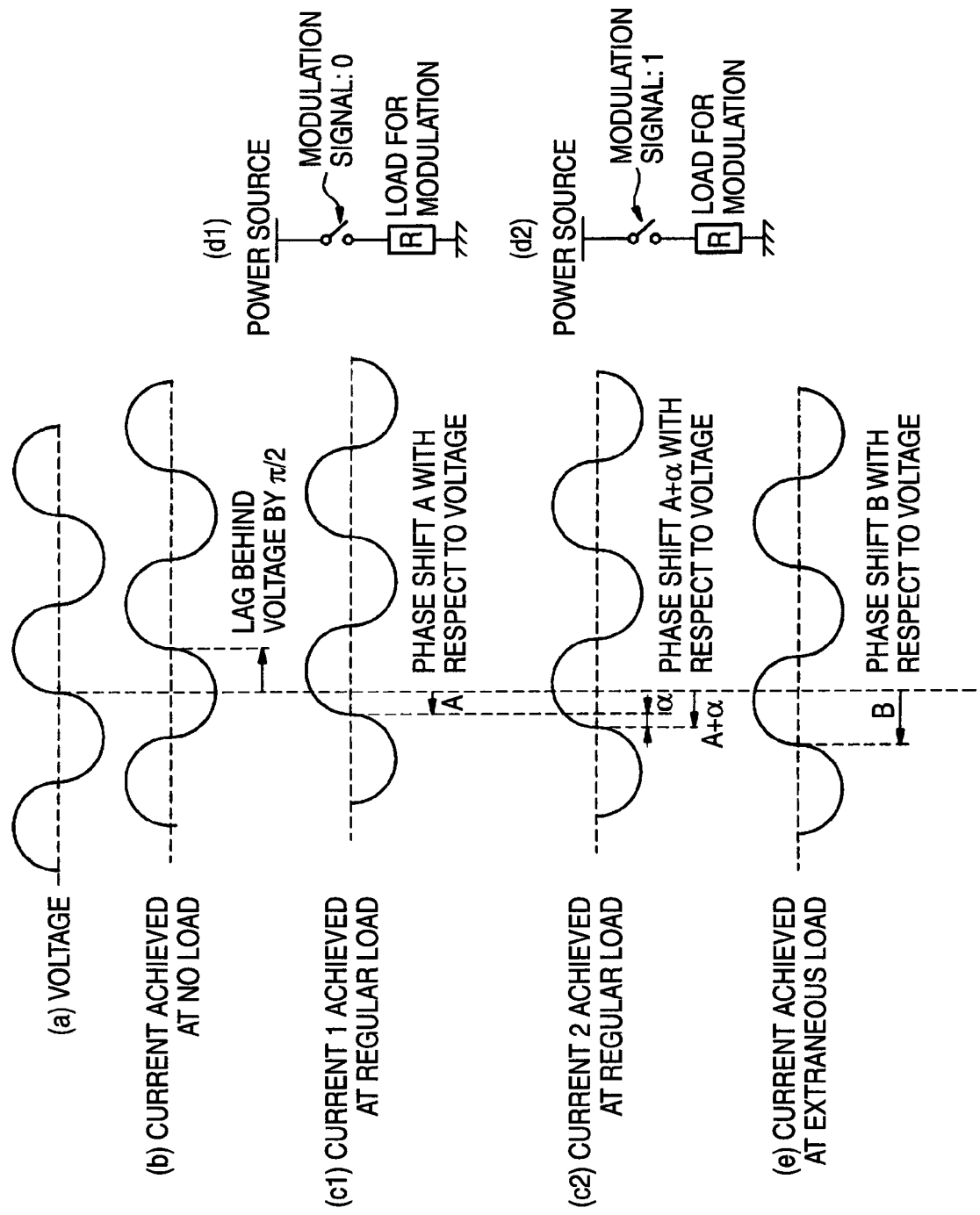
FIG. 2 is a descriptive view for describing the principle of signal transmission.

FIG. 2 shows, though described also in connection with Patent Document 3, a method for determining whether or not an object is placed on the contactless charger 200 and whether or not the object placed on the charger is the mobile phone 100; namely, the status of an object to be charged. As will be described later, the control section 230 of the contactless charger 200 generates at the time of determination a load check signal for checking presence or absence of a load, and AC power is sent from the coil 280 through modulation effected by the modulation section 240. (a) of FIG. 2 shows a voltage (a sinusoidal waveform) developing in the coil 280. In general, when an object is not placed on the contactless charger 200; namely, when there is no load, the phase of an AC current developing in the coil 280 lags essentially by $\pi/2$ (about 90 degrees), as shown in (b) of FIG. 2.

When the mobile phone 100 is placed on the contactless charger 200; namely, when there is a regular load; the phase of an AC current developing in the coil 280 is previously known to advance by predetermined amounts A and A+α, as shown in (c1), (c2) of FIG. 2. Accordingly, the contactless charger 200 can detect whether or not the mobile phone 100 is placed in accordance with such a change in current phase.

Two shifts in current phases shown in (c1), (c2) of FIG. 2 are provided as states in which the mobile phone 100 is placed. The drawings show a method for varying modulation load in the mobile phone 100, to thus modulate a load and make a difference also in phase shift of the AC current observed in the coil 280 on the basis of such a variation, whereby a digital signal transmitted from the mobile phone 100 to the contactless charger 200 is changed. In the present embodiment, in the case of basic load of the mobile phone 100, when a phase shift is A, the shift corresponds to "0" of a digital signal (see a conceptual rendering (d1)). In the case that predetermined load. R is further added to the basic load in the mobile phone 100, a phase shift assumes A+α (see a conceptual rendering (d2)). In this case, settings are made so as to correspond to "1" of the digital signal. Various combinations of "0" and "1" signals can be generated by varying the modulation load in time series, so that a plurality of types of digital signal sequences to be transmitted can be generated. Thus, transmission of various commands (a full charge command and a recharge command which will be described later, and the like) becomes possible. This corresponds to utilization of the concept of so-called PSK (Phase Shift Keying).

When so-called extraneous load that is not the mobile phone 100 is placed on the contactless charger 200, the AC current from the coil 280 causes a phase shift B, as shown in (e) of FIG. 2. The contactless charger 200 can determine from the phase shift that the placed substance is not the mobile phone 100.

When the contactless charger 200 sends a command to the mobile phone 100, a plurality of commands (a load check signal, a charge restart check command, and the like, which will be described later) can be transmitted by use of FSK (Frequency Shift Keying). In the mobile phone 100, the demodulation section 174 demodulates the commands.

The foregoing modulation scheme is illustrative, and no particular limitations are imposed on the scheme, so long as the scheme enables ascertainment of presence/absence of load and determination of a command.

Figure 3:
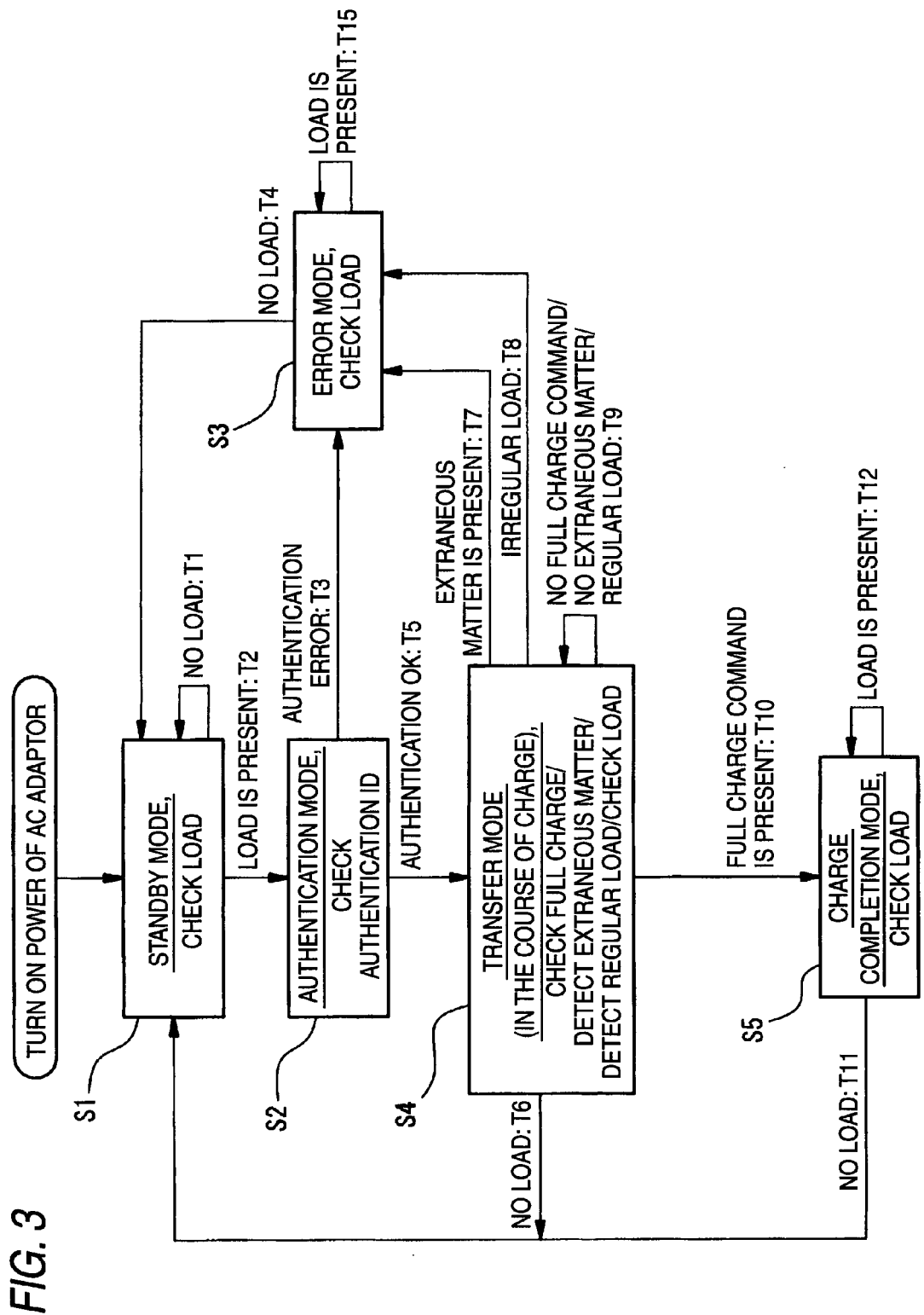
FIG. 3 is a state transition diagram of the contactless charger of the first embodiment.

Operation of the contactless charging system of the present embodiment will now be described. FIG. 3 is a state transition diagram showing the state transition of the contactless charger 200 of the present embodiment. First, when the power of the AC adaptor 300 is turned on, to thus activate the power source of the contactless charger 200 (S0), the control section 230 shifts the contactless charger 200 to a standby mode corresponding to an initial state (S1). At this time, the control section 230 checks presence or absence of load in accordance with the scheme shown in FIG. 2. Specifically, the control section 230 generates a load check signal for checking presence or absence of load, and AC power is transmitted from the coil 280 through modulation performed by the modulation section 240. As shown in (b) of FIG. 2, in the case (T1) that load is determined to be absent from the current phase, the control section 230 maintains the contactless charger 200 in a standby mode.

In the meantime, in the case (T2) that load is determined to be present from the current phase as shown in (c1), (c2), and (d) of FIG. 2, the control section 230 shifts the contactless charger 200 to an authentication mode (S2). At this time, the control section 230 generates an authentication request command for requesting to perform authentication, and the command is transmitted from the coil 280 through modulation performed by the modulation section 240. When a digital signal originating from the load in response to the command is demodulated by the demodulation section 260, the authentication section 250 authenticates and determines the demodulated digital signal, thereby determining whether or not an authentication ID of the mobile phone 100 can be acquired. In the case (T3) that the authentication ID is not acquired; namely, somewhat error has arisen in authentication, the control section 230 brings the contactless charger 200 into an error mode (S3). The control section 230 again checks whether or not there is load, in accordance with the scheme shown in FIG. 2. In the case (T4) that load is determined to be absent, the contactless charger 200 is again brought into a standby mode (S1). When load is determined to be present (T15), an error mode is maintained (S3).

In the case (T5) that the authentication section 250 authenticates the mobile phone 100 in the authentication mode (S2), the control section 230 shifts the contactless charger 200 to a transfer mode (in course of recharge) (S4). When the digital signal from the mobile phone 100 is demodulated by the demodulation section 260, the authentication section 250 authenticates and determines the demodulated digital signal, thereby determining whether or not the signal is a full charge command indicating completion of recharge of the battery cell 160 of the mobile phone 100. Further, in accordance with the scheme shown in FIG. 2, the authentication section 250 also determines whether load is normal or extraneous and checks load. On the basis of determination results, the control section 230 shifts the mode of the contactless charger 200 as follows.

Specifically, in the case (T6) that load is determined to be absent, the control section 230 again shifts the contactless charger 200 to the standby mode (S1). In the case (T7) that extraneous load is determined to be present or in the case (T8) that irregular load is determined to be present, the control section 230 shifts the contactless charger 200 to an error mode (S3). In the case (T9) that a full charge command and extraneous load are determined to be absent and when regular load is determined to be present, the contactless charger still remains in recharge, and hence the control section 230 maintains the contactless charger 200 in the transfer mode (S4).

In the case (T10) that the authentication section 250 determines the full charge command in the transfer mode (S4), the control section 230 shifts the contactless charger 200 to a recharge completion mode corresponding to a charge stop state in order to complete charging operation (S5). In the case (T12) that the control section 230 has ascertained presence of load in accordance with the scheme shown in FIG. 2, the load still remains placed; therefore, the control section 230 holds the contactless charger 200 in the recharge completion mode (T12). In the meantime, in the case (T11) that the control section 230 has ascertained absence of load, the load is already removed; therefore, the control section 230 again shifts the contactless charger 200 to the standby mode (S1).

Figure 4:
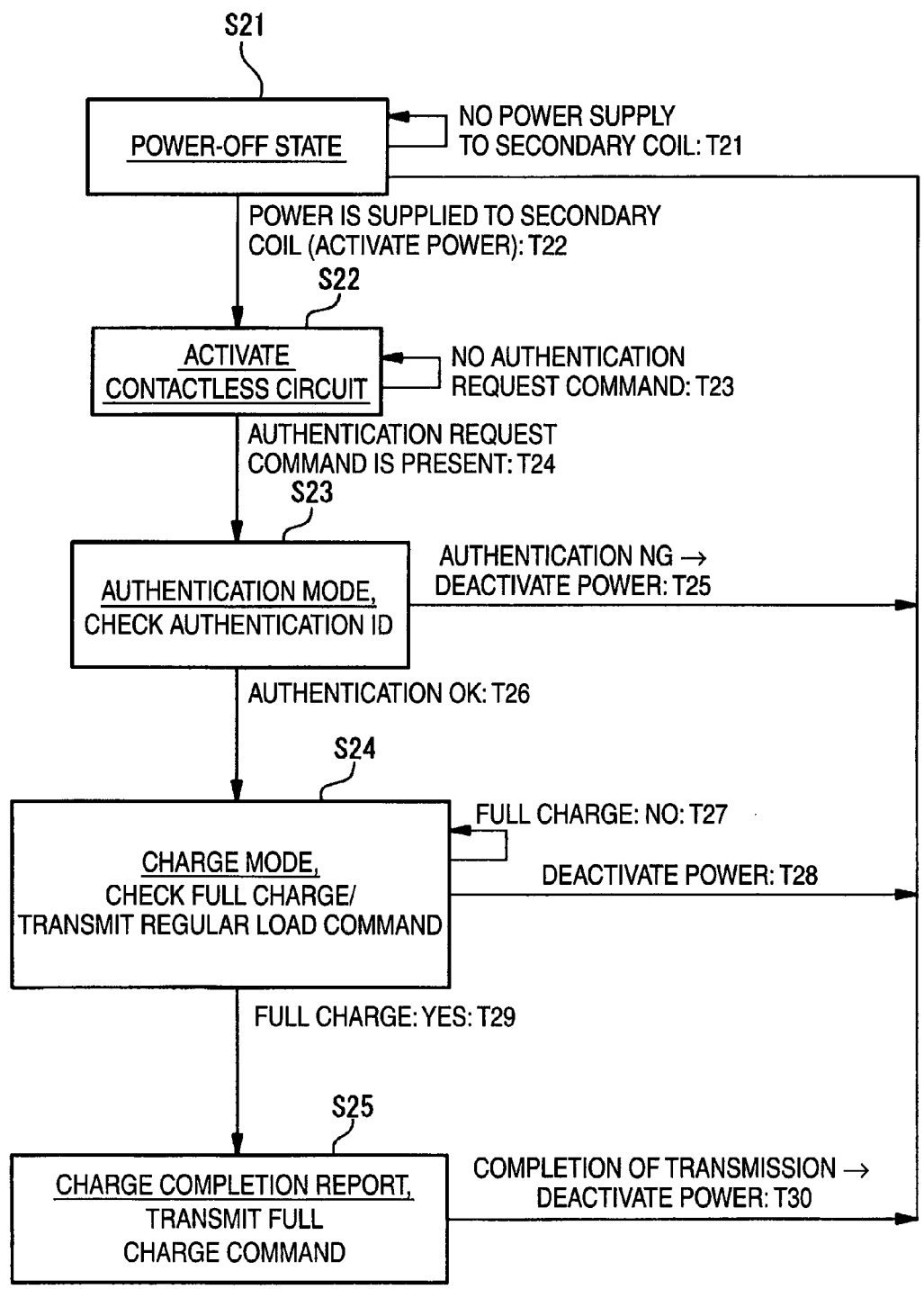
FIG. 4 is a state transition diagram of a mobile phone of the first embodiment.

FIG. 4 is a state transition diagram showing the state transition of the mobile phone 100 of the embodiment. First, power is not supplied from the contactless charger 200, and the power source of the contactless charging circuit 170 is turned off and brought into an initial state (S21).

Subsequently, in the case (T22) that AC power is supplied from the contactless charger 200 to the coil 177 in a transfer mode pertaining to S4 shown in FIG. 3, the contactless charging circuit 170 is activated (S22). In the case (T23) that acquired no authentication request command, the control section 171 maintains the state of the contactless charging circuit 170 achieved at startup. In the meantime, in the case (T24) that acquired the authentication request command, the control section 171 shifts the mobile phone 100 (the contactless charging circuit 170) to the authentication mode (S23). On the basis of a result of authentication performed by the authentication section 172, the control section 171 authenticates the contactless charger 200.

When authentication has ended in a failure, power supply from the coil 280 is interrupted. Therefore, the power source is turned off (T25), and the power of the contactless charging circuit 170 is deactivated (S21). In the meantime, in the case (T26) that authentication has been successfully performed, the control section 171 shifts the mobile phone 100 (the contactless charging circuit 170) to the charge mode (S24). The control section 171 checks whether or not a full charge status is acquired from the charging circuit 140. In the case (T27) that the full charge status is not acquired, charge still remains uncompleted; therefore, the control section 171 maintains the mobile phone 100 in a charge mode (S27). When a power supply to the coil 177 is stopped as a result of disconnection of the mobile phone 100 from the contactless charger 200, the power source of the contactless charging circuit 170 is turned off (T28), and the contactless charging circuit again shifts to a power-off state (S21).

In the case (T29) that a full charge status is acquired from the charging circuit 140, charging is completed. Hence, the control section 171 transmits a recharge completion report; i.e., a full charge command, to the contactless charging circuit 200 by way of the authentication section 172, the modulation section 173, the rectifying circuit 176, and the coil 177 (S25). Since the power supply from the coil 280 is stopped after transmission of the command, the contactless charging circuit 170 is deactivated (T30) and again shifts to the power-off state (S21).

Figure 5:
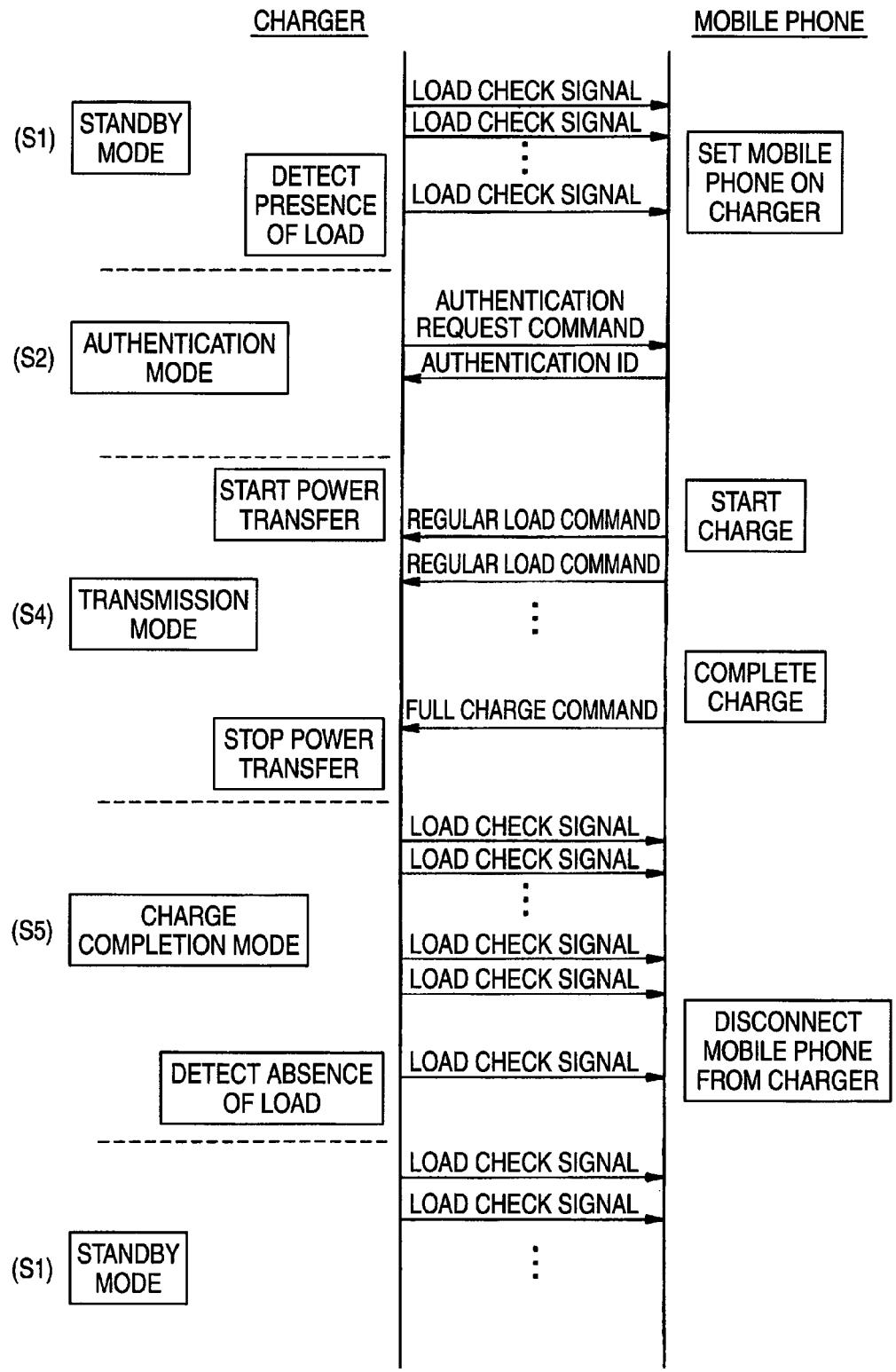
FIG. 5 is a sequence diagram showing exchange of signals between the contactless charger and the mobile phone in the contactless charging system of the first embodiment.

FIG. 5 is a sequence diagram for describing exchange of signals (an authentication ID and commands) between the contactless charger 200 and the mobile phone 100 of the present embodiment. In a standby mode (S1 in FIG. 3), a load check signal is transmitted at predetermined time intervals from the contactless charger 200 to the mobile phone 100. When the mobile phone 100 is placed on the contactless charger 200, the contactless charger 200 detects the mobile phone 100 in accordance with the scheme shown in FIG. 2.

In the authentication mode (S2 in FIG. 3), an authentication request code is transmitted from the contactless charger 200 to the mobile phone 100, and an authentication ID is transmitted as an answer signal from the mobile phone 100 to the contactless charger 200. In a transfer mode (S4 in FIG. 3), a regular load command indicating that load is regular is transmitted at predetermined time intervals from the mobile phone 100 to the contactless charger 200, and transmission of power from the contactless charger 200 to the mobile phone 100 is maintained. When recharge of the mobile phone 100 is completed, the full charge command is transmitted from the mobile phone 100 to the contactless charger 200, whereupon power transmission is stopped.

In the recharge completion mode (S5 in FIG. 4), the load check signal is transmitted at predetermined time intervals from the contactless charger 200 to the mobile phone 100. For instance, when the mobile phone 100 is disconnected from the contactless charger 200, the contactless charger 200 detects absence of the mobile phone 100 in accordance with the scheme shown in FIG. 2, thereby again shifting to the standby mode. The error mode (S3 in FIG. 3) is not shown in FIG. 5.

Figure 6:
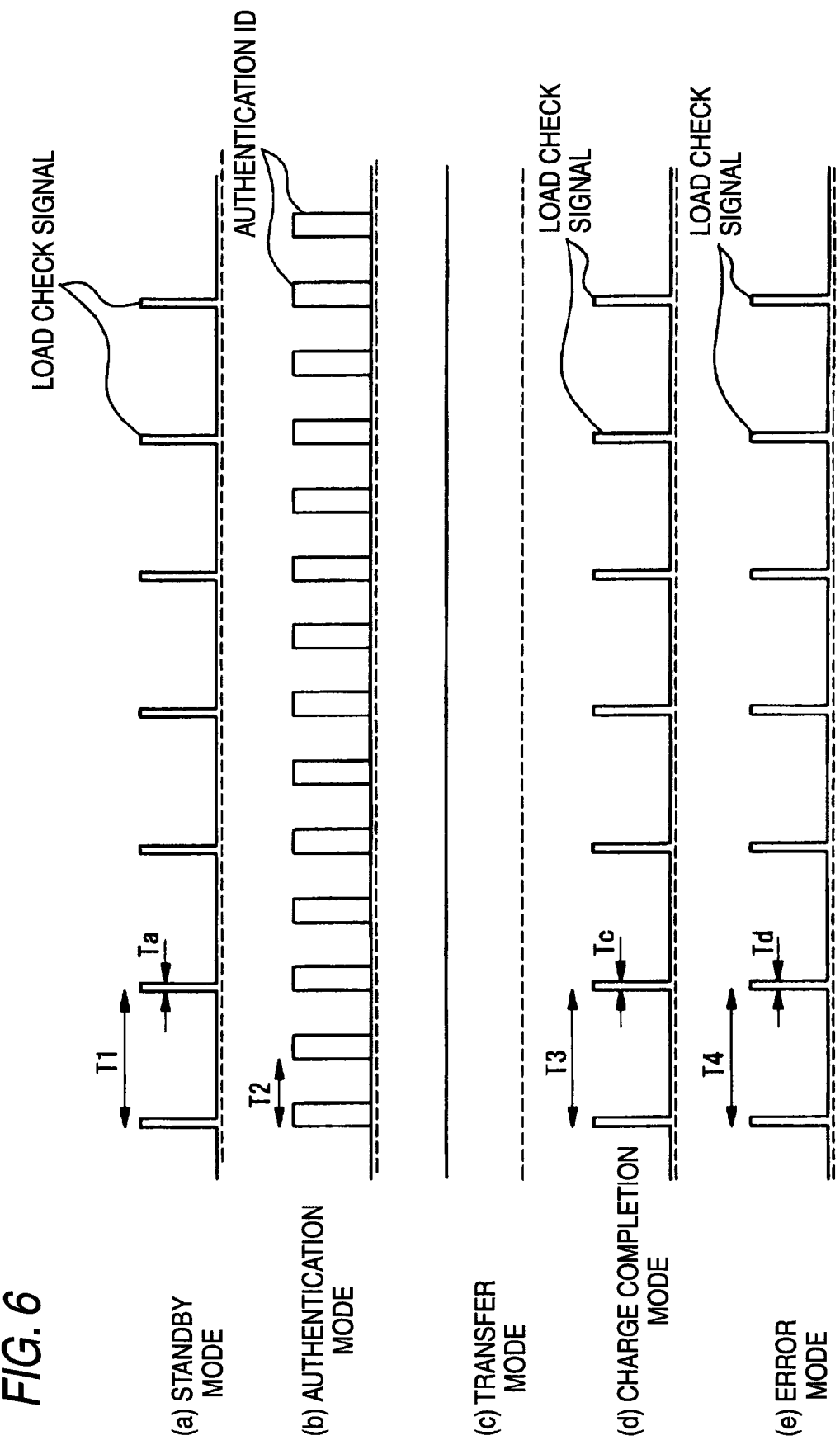
FIG. 6 is a view showing operation timing charts achieved in respective modes of the contactless charger of the first embodiment.

FIG. 6 is a view conceptually showing operation timings of the contactless charger 200 in the form of H or L. An H period represents that the charger 200 is in operation (any of operation for transferring a load check signal and checking load, authentication operation, and power transmission operation), and an L period represents that signal transfer and power transfer operation are stopped. In respective modes; namely, a standby mode (a); an authentication mode (b); a transfer mode (c); a charge completion mode (d); and an error mode (e), transfer of a signal from the contactless charger 200 to the mobile phone 100 is modulated by the modulation section 240 through; for example, FSK (Frequency Shift Keying), as mentioned above, and the signal is transmitted to the load by way of the coil driver circuit 270 and the coil 280.

In the standby mode (a) of FIG. 6, the contactless charger 200 checks presence/absence of load at predetermined intervals by a load check signal. In the case that there is no load, the standby mode is maintained. After detection of load, transition to the authentication mode is carried out. An operation interval T1 is set to a comparatively-large value in order to curtail standby power. Moreover, since only presence/absence of load is checked, a duration Ta of the operation time is comparatively small.

In the authentication mode (b) of FIG. 6, an operation interval T2 is set so as to become smaller than T1; however, the operation interval is not limited to a relationship of T2<T1. Further, as shown in FIG. 5, after the contactless charger 200 has issued an authentication request command in the authentication mode, return of the authentication ID from the mobile phone 100 is required. In order to make an operating state continuous for a predetermined period of time until the authentication ID is returned, a duration Tb of the operation time is comparatively large. In the present embodiment, the duration is set to a relationship of Ta<Tb.

In the transfer mode (c) of FIG. 6, the contactless charger 200 holds an operating state. In the charge completion mode (d) of FIG. 6, the contactless charger 200 checks presence/absence of load at predetermined intervals by a load check signal. In the case that load is present, the mode is maintained. After detection of absence of load, transition to the standby mode is performed. In order to curtail standby power, an operation interval T3 is set to a comparatively-large value. In the present embodiment, the interval is set to a relationship of T3=T1. Further, since only presence/absence of load is checked, a duration Tc of the operation time is comparatively small. In the present embodiment, the duration assumes a relationship of Tc=Ta.

In the error mode (e) of FIG. 6, the contactless charger 200 checks presence/absence of load at predetermined intervals by a load check signal. In the case that load is present, the error mode is maintained. After detection of absence of load, transition to the standby mode is effected. In order to curtail standby power, a duration T4 of operation is set to a comparatively-large value. In the present embodiment, there stands relationship of T4=T3=T1. Moreover, only presence/absence of load is checked, a duration Td of the operation time is comparatively small. In the present embodiment, the duration assumes a relationship of Td=Tc=Ta.

In the present embodiment, T1=T3=T4 and Ta=Tc=Td are achieved. Hence, the stand mode/the charge completion mode/the error mode are completely identical with each other in terms of operation timing. However, different determination operations are performed, and the modes differ from each other in terms of a destination to which a mode shift is to be made. Hence, the modes cannot be shared. In particular, differentiating between the charge completion mode and the error mode makes it possible to separately issue an alarm about charge completion and an error state (e.g., by a change in beep sound, or the like).

According to the first embodiment of the present invention, the load check signal is intermittently generated and transmitted in the charge completion mode corresponding to a charge stop state. Therefore, there are provided a contactless charging system that enables a reduction in power which would be consumed by contactless charger after completion of charging operation while maintaining ease of use equal to that achieved in the related art and that allows for a safety measure, such as reduction of heat generated at the time of completion of recharge; and a contactless charger and an electronic device which are applied to such a system.

Second Embodiment

Figure 7:
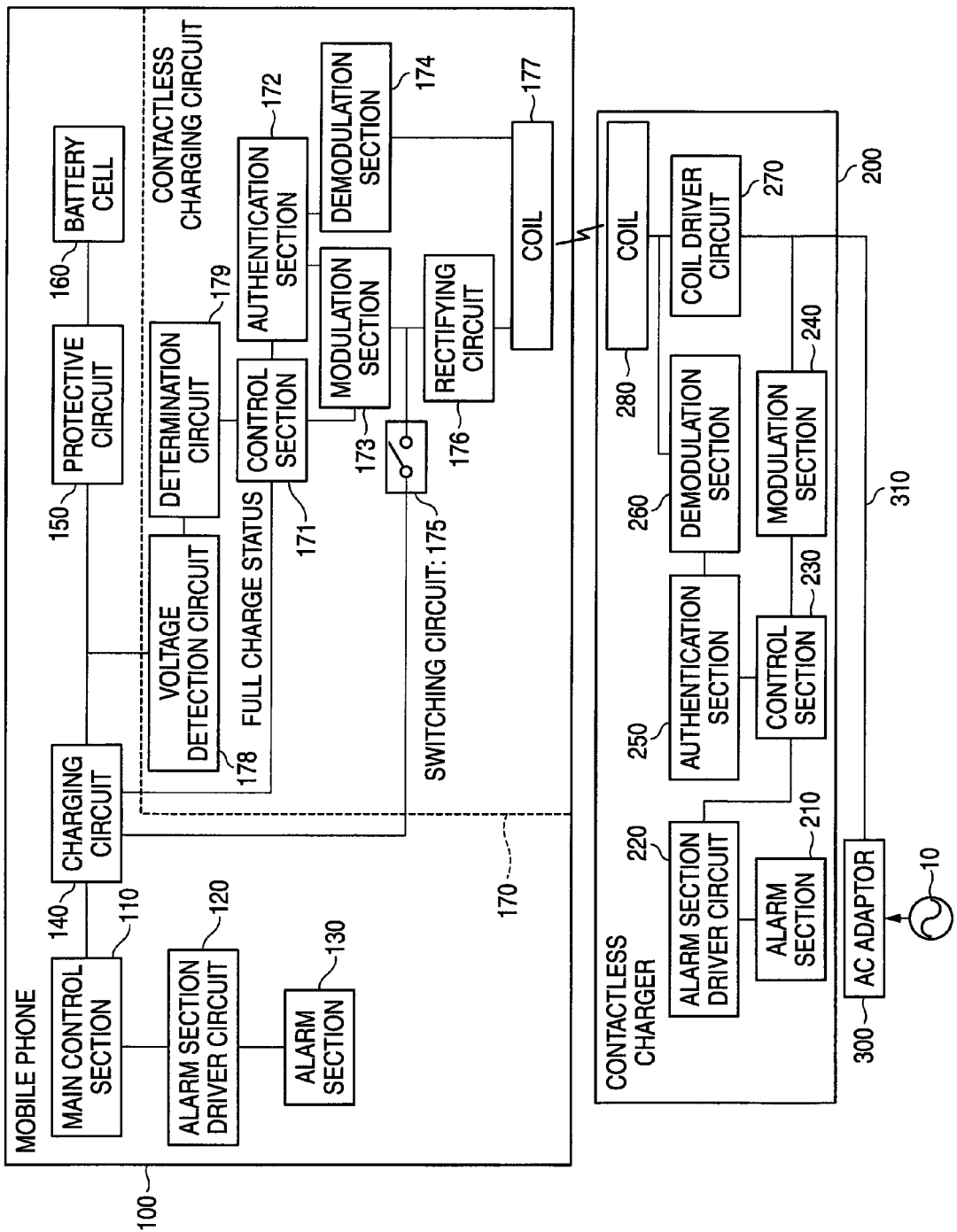
FIG. 7 is a block diagram for describing an overview of a contactless charging system of a second embodiment of the present invention.

FIG. 7 is a block diagram for describing an overview of a contactless charging system of a second embodiment of the present invention. As shown in FIG. 7, the present embodiment differs from the first embodiment in that the contactless charging circuit 170 is additionally provided with a voltage detection circuit 178 and a determination circuit 179. The voltage detection circuit 178 is connected to the protective circuit 150, and the determination circuit 179 is connected between the voltage detection circuit 178 and the control section 171.

Figure 9:
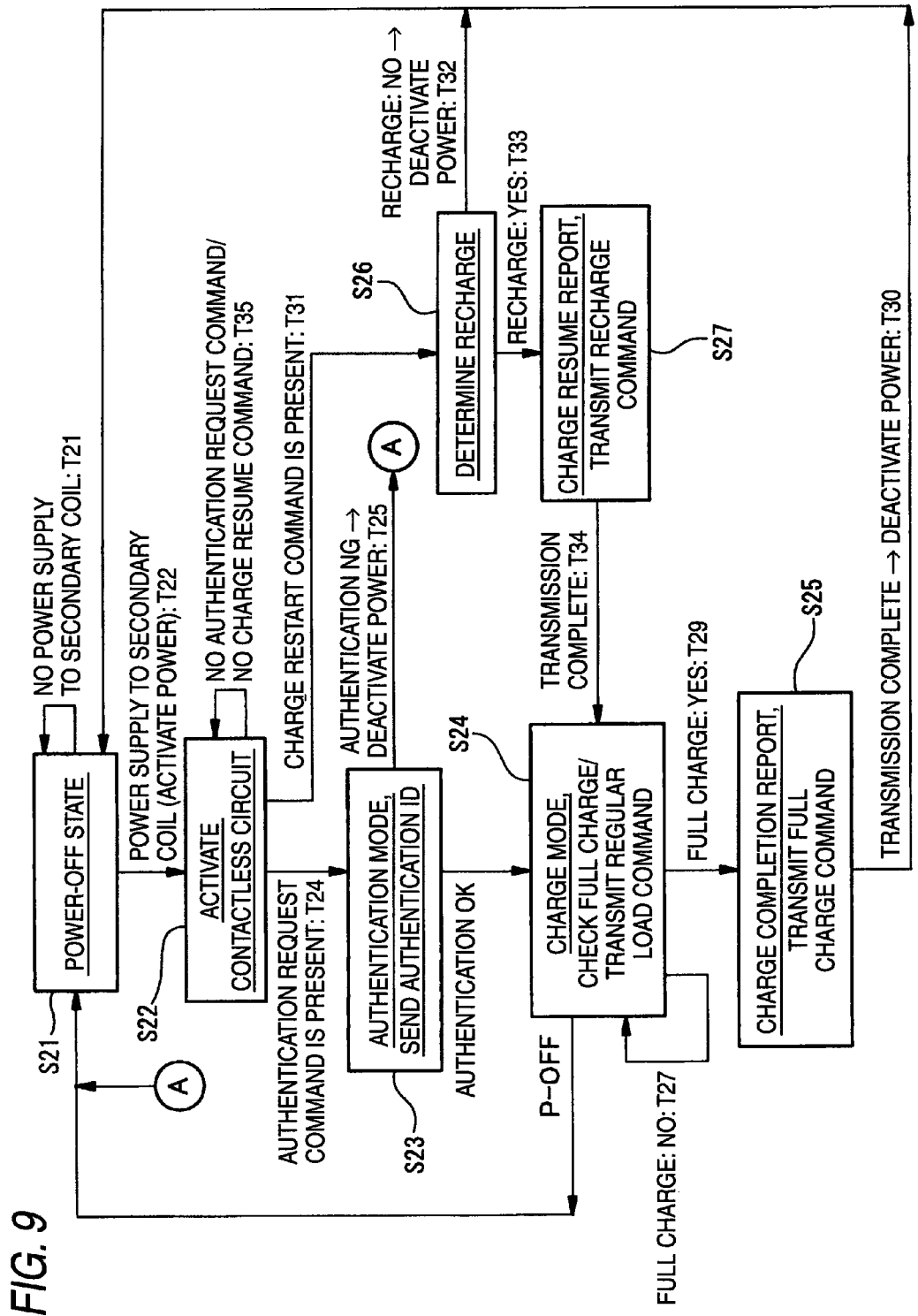
FIG. 9 is a state transition view of a mobile phone of the second embodiment.

In contrast with the first embodiment, in the case that the mobile phone 100 again needs recharging after completion of recharge, the contactless charging system is imparted with a function of restarting charge in the present embodiment. When the mobile phone 100 is left on the contactless charger 200 after having finished being recharged, there are cases where the voltage of the battery cell 160 decreases. Even in such a case, the contactless charging system of the present embodiment is arranged so as to automatically restart charge, thereby enhancing usability. Specifically, after the control section 171 of the mobile phone 100 has received a full charge status (T29; FIG. 9) and completed recharge, the voltage detection circuit 178 detects the voltage of the battery cell 160 by way of the protective circuit 150 at the time of receipt of the charge restart check command. When the voltage detected by the voltage detection circuit 178 has decreased to a predetermined value or less, the determination circuit 179 transmits to the control section 171 a voltage drop status showing that the voltage has decreased to a predetermined value or less. The control section 171 transmits a recharge command for requesting recharge to the contactless charger 200 by way of the authentication section 172, the modulation section 173, the rectifying circuit 176, and the coil 177. Specifically, the recharge command is transmitted from the mobile phone 100 to the contactless charger 200 along the following path.

The protective circuit 150→the voltage detection circuit 178→the determination circuit 179→the control section 171→the authentication section 172→the modulation section 173→the rectifying circuit 176→the coil 177→the coil 280→the demodulation section 260→the authentication section 250→the control section 230

Figure 8:
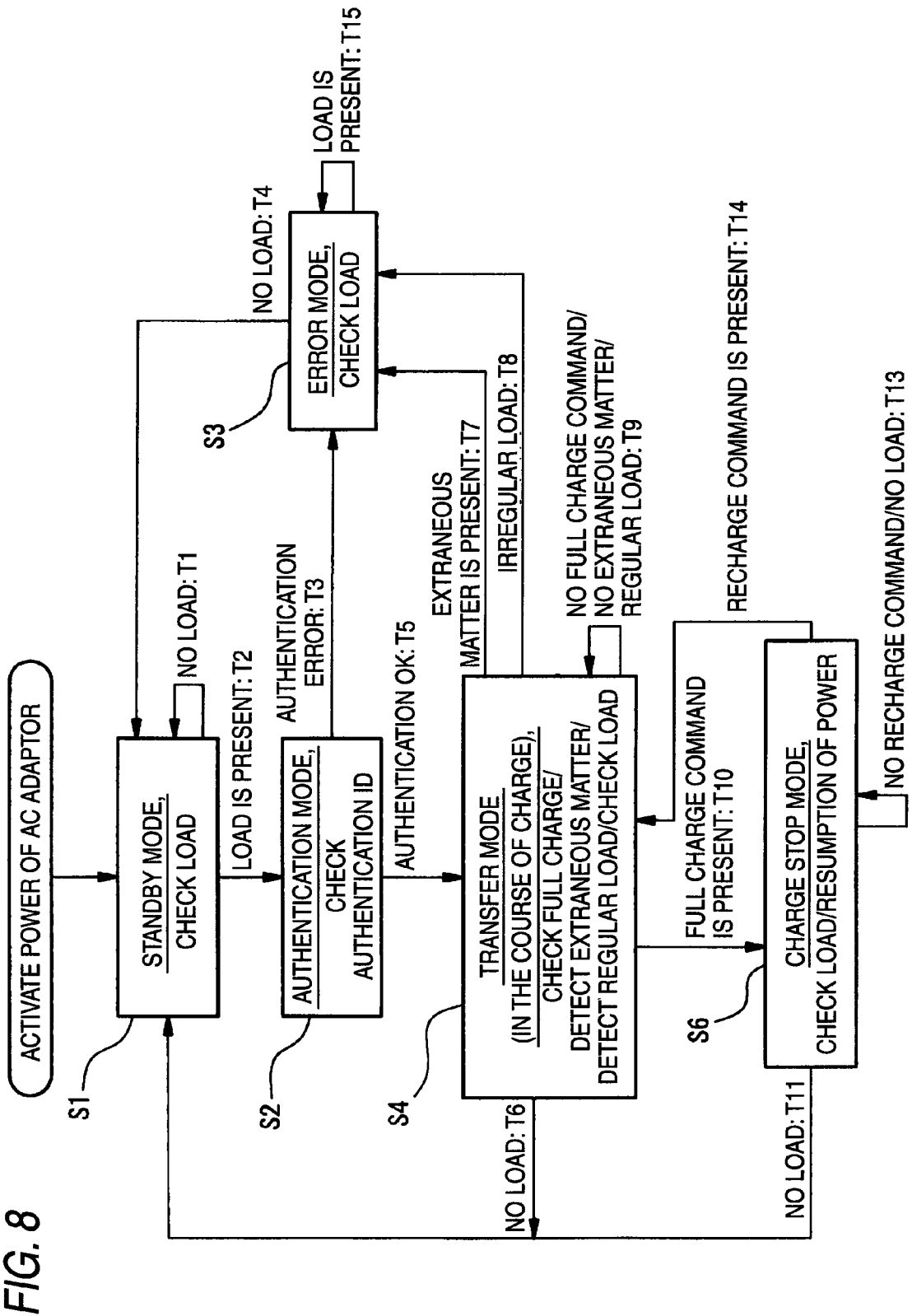
FIG. 8 is a state transition view of the contactless charter of the second embodiment.

FIG. 8 is a state transition diagram showing state transition of the contactless charger 200 of the present embodiment. Respective modes of S1 through S4 and transition steps of T1 through T11 and T15 are common to the state transition diagrams of the first embodiment shown in FIG. 3. In the embodiment, a charge stop mode (S6) and transition steps T13 and T14 are newly prepared in place of the charge completion mode (S5) and the transition step T12 following T10 in the first embodiment.

In the charge stop mode (S6), the contactless charger 200 checks presence/absence of load and restart of charge. In the transfer mode (S4), in the case (T10) that the authentication section 250 determines the full charge command, the control section 230 shifts the contactless charger 200 to the charge stop mode for completing recharge (S6). The control section 230 transmits the load check signal and a charge restart check command for checking whether or not the mobile phone requires recharge. Pursuant to an answer to the command, the control section 230 checks presence of load. In the case (T13) that the recharge command is not received from the mobile phone 100, recharge is not required while the load is still placed. Hence, the control section 230 holds the contactless charger 200 in the charge stop mode (S6). In the meantime, when the control section 230 has checked absence of load (T11), the load is already removed. Hence, the control section 230 again shifts the contactless charger 200 to the standby mode (S1). Upon receipt of the recharge command from the mobile phone 100 by way of the coil 280, the demodulation section 260, and the authentication section 250 (T14), the control section 230 shifts the contactless charger 200 to the transfer mode (S4), thereby resuming recharge of the mobile phone 100.

Figure 13:
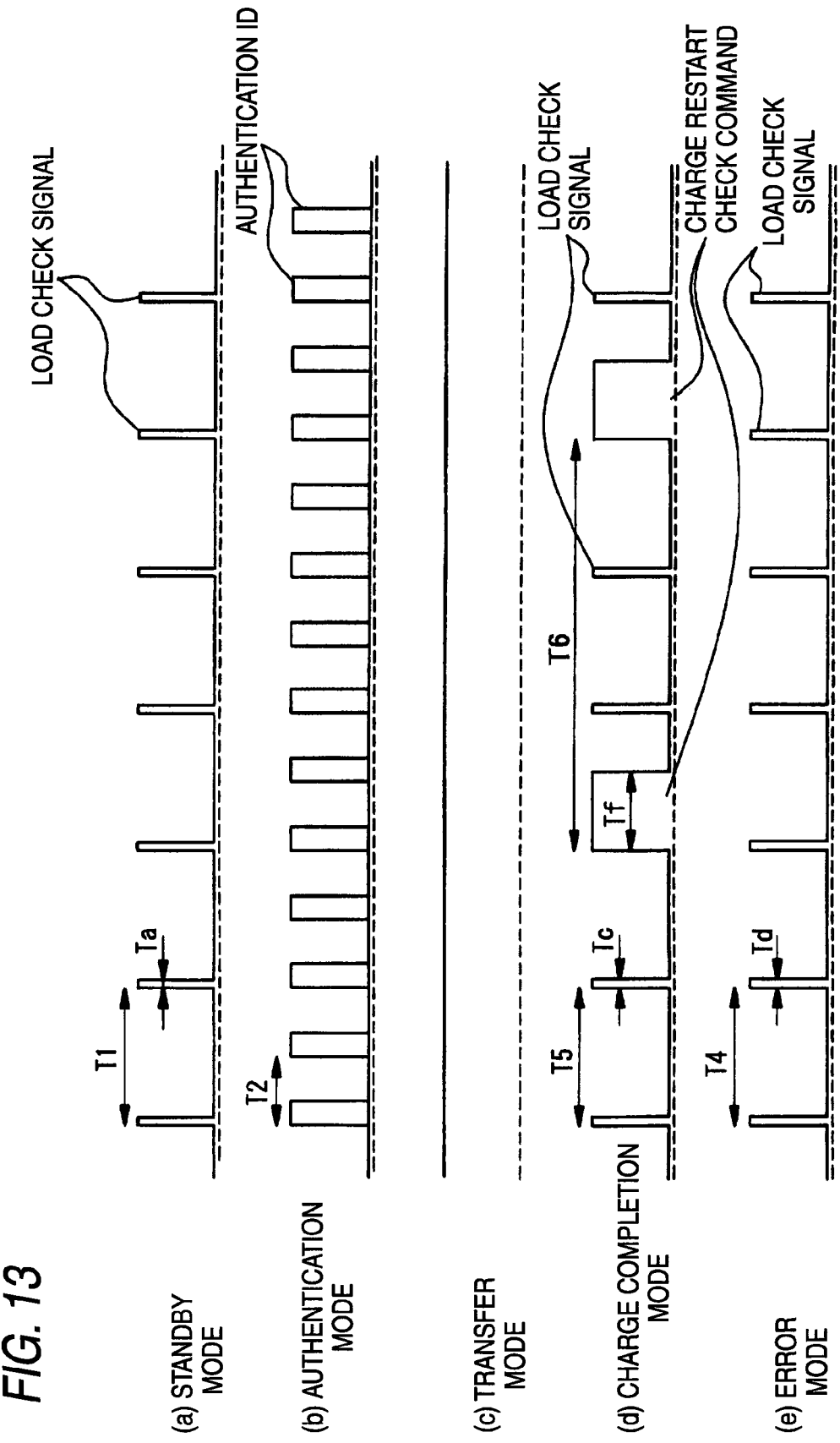
FIG. 13 is a view showing operation timing charts achieved in respective modes of the contactless charger of the second embodiment.

In the charge stop mode (S6), timing for checking load (transmission of the load check signal) and timing for checking restart of charge (transmission of the charge restart check command) are shifted from each other (see (d) of FIG. 13). When the check operations are not performed, the control section 230 stops operation of the contactless charger 200. Accordingly, heat generation and an increase in temperature of the contactless charger 200 are prevented, and safety is assured. Further, standby power of the charger required when recharge is stopped can be curtailed.

FIG. 9 is a state transition diagram showing state transition of the mobile phone 100 of the present embodiment. Respective states of S21 to S25 and transition steps of T21 to T30 are common to the state transition diagram of the first embodiment shown in FIG. 4. In the present embodiment, a recharge determination (S26), charge resumption (S27), and transition steps T31 to T34 and T35 are newly prepared after S22 of the first embodiment.

After start of the contactless charging circuit 170 (S22), in the case (T35) that there are not the authentication request command and the charge restart check command, the started state of the contactless charging circuit 170 is maintained (S22). In the case (T31) that there is the charge restart check command, the voltage detection circuit 178 detects a battery voltage of the battery cell 160, and the determination circuit 179 determines the necessity for recharge (S26). When the determination circuit 179 determines that recharge is not necessary, a power supply from the coil 280 will be stopped in due course, and the contactless charging circuit 170 is turned off (T32) and returns to an initial power-off state (S21). In the meantime, in the case (T33) that the determination circuit 179 determines that recharge is necessary, the control section 171 received the determination starts transmitting a recharge command indicating a request for resuming charge (S27). The command is transmitted to the contactless charger 200 by way of the authentication section 172, the modulation section 173, the rectifying circuit 176, and the coil 177 (T34), and the mobile phone 100 shifts to the charge mode (S24).

Figure 10:
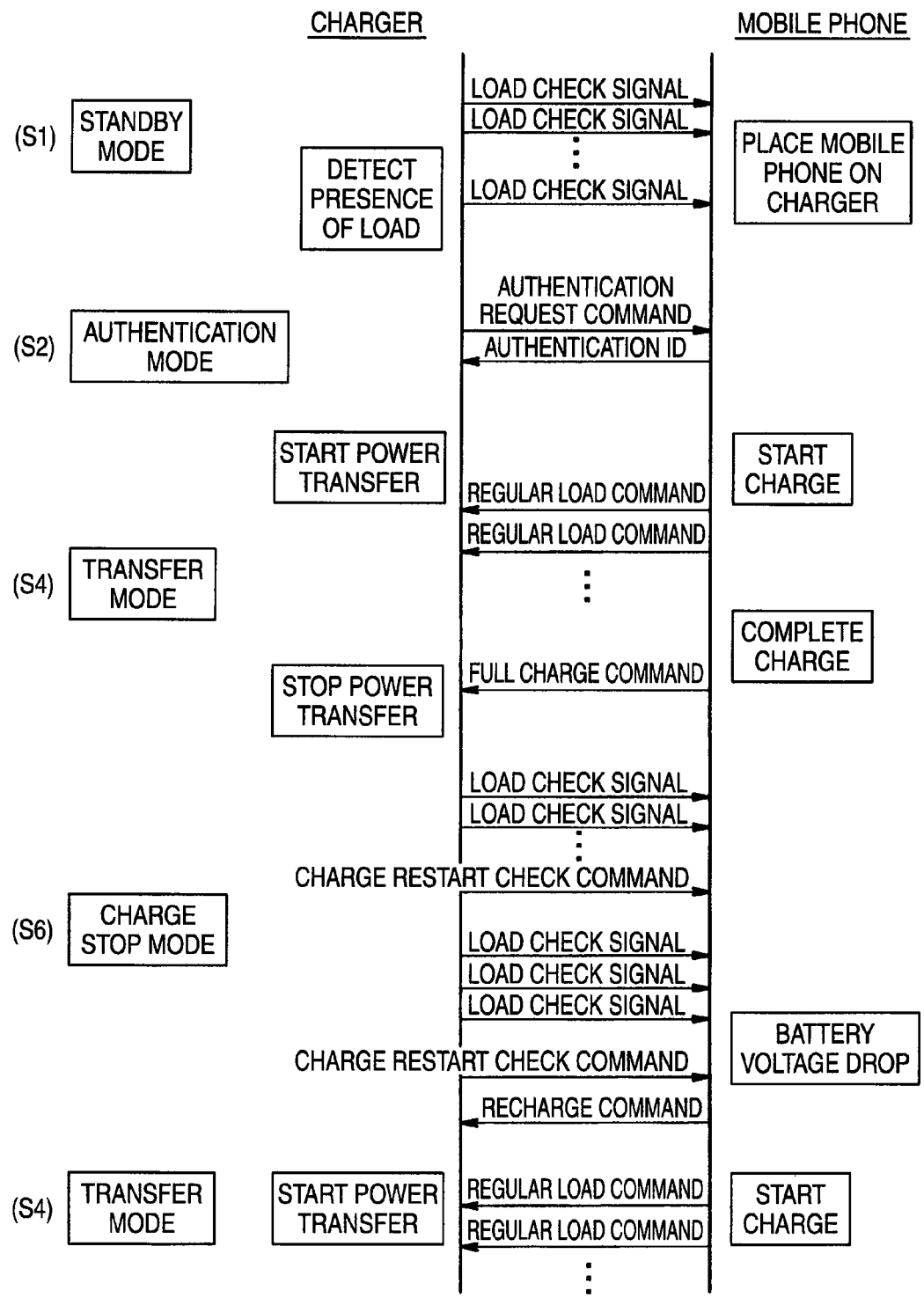
FIG. 10 is a sequence diagram showing exchange of signals between the contactless charger and the mobile phone in the contactless charging system of the second embodiment.

FIG. 10 is a sequence diagram for describing exchange of signals (an authentication ID and commands) between the contactless charger 200 and the mobile phone 100 of the embodiment. The standby mode (S1), the authentication mode (S2), and the transfer mode (S4) are common to FIG. 5. In the present embodiment, a charge stop mode (S6; FIG. 10) is provided in lieu of the charge completion mode (S5) shown in FIG. 5.

In the charge stop mode (S6), a load check signal is transmitted from the contactless charger 200 to the mobile phone 100 at predetermined time intervals, and a charge restart check command is transmitted at different predetermined time intervals. When the charge restart check command is received after the voltage of the battery cell 160 of the mobile phone 100 has dropped to a predetermined voltage, the mobile phone 100 transmits the recharge command. In accordance with the recharge command, the contactless charger 200 again shifts to the transfer mode (S4). An error mode (FIG. 3 and S3; FIG. 8) is not provided in FIG. 10.

Figure 11:
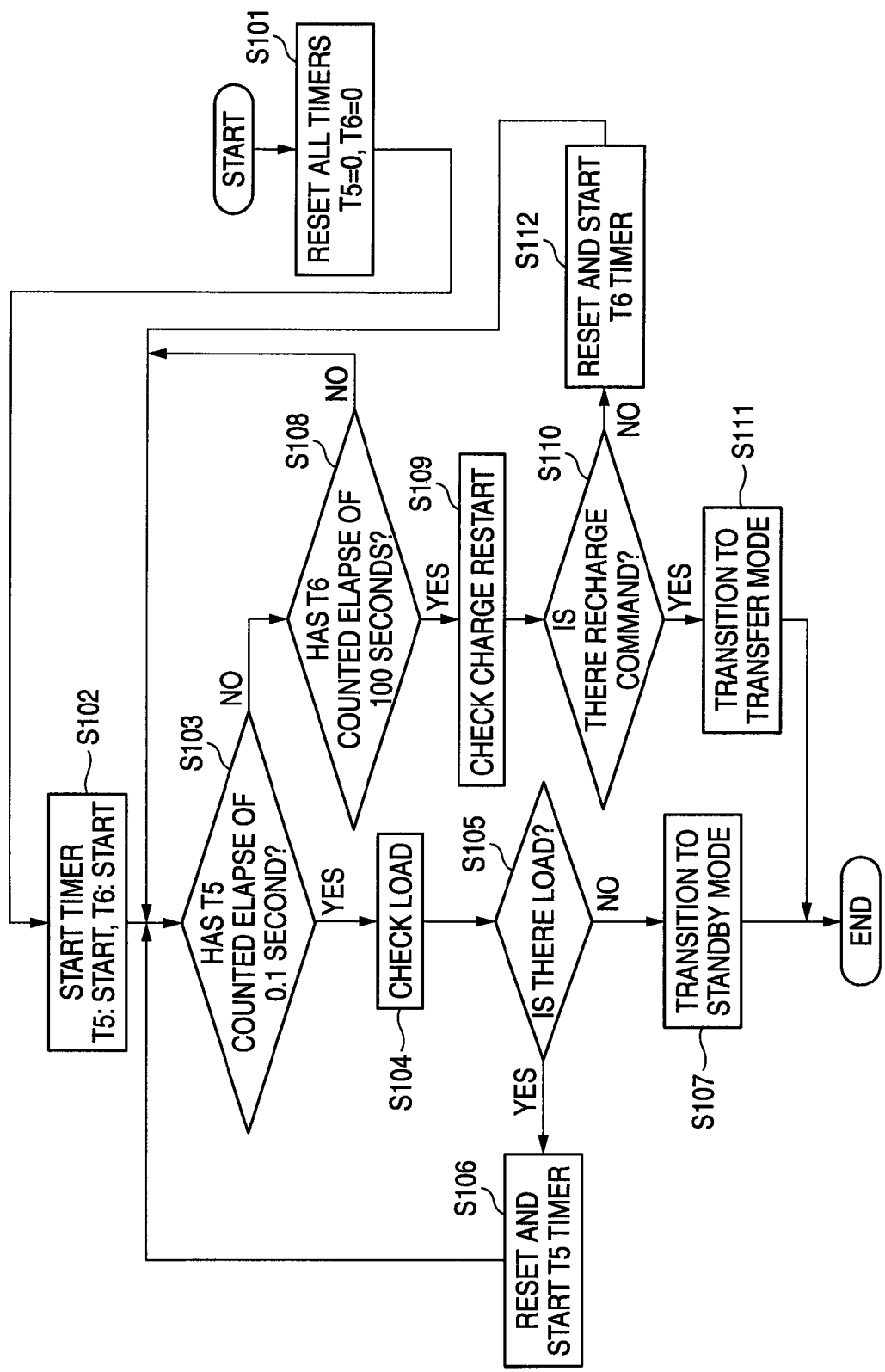
FIG. 11 is a flowchart showing operation of the contactless charger of the second embodiment performed in a recharge stop mode.

FIG. 11 is a flowchart showing operation of the contactless charger 200 of the embodiment achieved in the charge stop mode. In the present embodiment, T5 is a cycle of load check timing, and T6 is a cycle of charge restart check timing (see FIG. 13). In the present example operation, T5 is set to 0.1 s (second), and T6 is set to 100 s.

First, the control section 230 resets counts of unillustrated timers (a T5 timer and a T6 timer) that count T5 and T6 provided in the contactless charger 200, thereby setting the timers to T5=0 and T6=0 (step S101). The timers start counting in accordance with a predetermined trigger signal from the control section 230, thereby starting counting T5 and T6 (step S102).

When the T5 timer detects that T5 elapses 0.1 s (YES; step S103), the contactless charger 200 ascertains presence/absence of load in accordance with foregoing procedures (step S104). When presence of load is checked (YES; step S105), the T5 timer resets a count of T5 by a predetermined trigger signal from the control section 230 and again starts counting (step S106). Processing then returns to step S103. In the meantime, when presence of load is not ascertained in step S105 (NO; step S105), the contactless charger 200 shifts to the standby mode in accordance with the foregoing procedures (step S107), and the charge stop mode ends.

When the T5 timers does not detect, in step S103, that T5 has elapsed 0.1 s (NO; step S103), a determination is made as to whether or not the count of T6 performed by the T6 timer has exceeded 100 s (step S108). When the T6 timer does not detect that T6 has elapsed 100 s (NO; step S108), processing again returns to step S103, and processing pertaining to procedures subsequent to the step is performed. In the meantime, when the T6 timer detects that T6 has elapsed 100 s (YES; step S108), the contactless charger 200 transmits the charge restart check command to the mobile phone 100 and awaits an answer from the mobile phone 100 (step S109).

When a recharge command is present in the answer from the mobile phone 100 (YES; step S110), the contactless charger 200 shifts to the transmission mode in accordance with the foregoing procedures (step S111), and the charge stop mode ends. In step S110, when the recharge command is not present in the answer from the mobile phone 100 (NO; step S110), the T6 timer resets a count of T6 in accordance with a predetermined trigger signal from the control section 230 and again starts counting operation (step S112), and processing returns to step S103.

Figure 12:
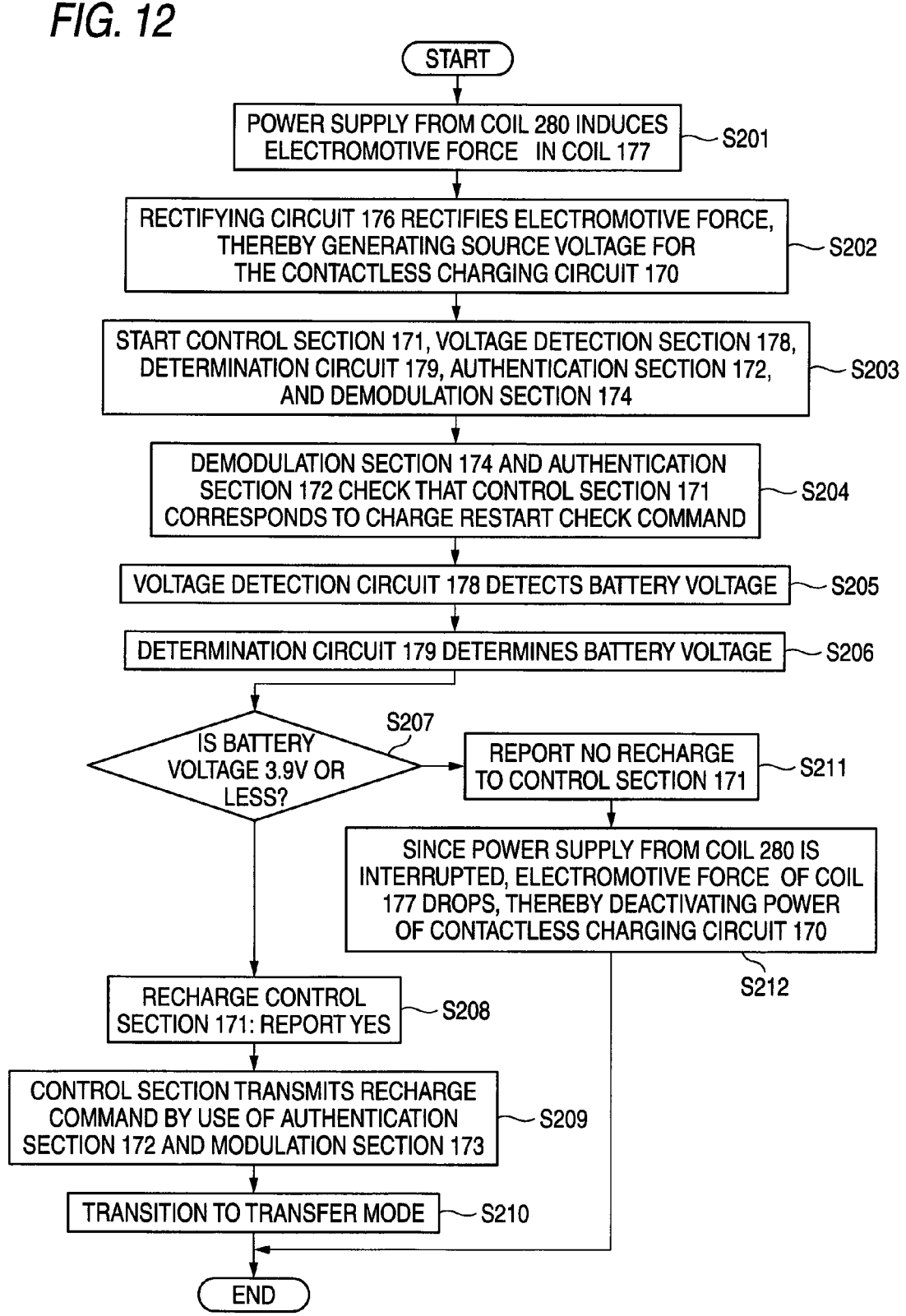
FIG. 12 is a flowchart showing operation of the mobile phone of the second embodiment performed when restart of charging of the mobile phone is ascertained.

FIG. 12 is a flowchart showing operation performed when restart of charge of the mobile phone 100 of the present embodiment is checked. A recharge start voltage that is detected by the voltage detection circuit 178 and that corresponds to a limit voltage at which recharge of the battery cell 160 is required is set to 3.9V.

First, electromotive force arises in the coil 177 as a result of supply of electric power from the coil 280 of the contactless charger 200 (step S201). The rectifying circuit 176 rectifies the electromotive force, thereby generating a source voltage for the contactless charging circuit 170 (step S202). In response to generation of the source voltage, the control section 171, the voltage detection circuit 178, the determination circuit 179, the authentication section 173, and the demodulation section 174 are activated (step S203).

From results of authentication and determination performed by the demodulation section 174 and the authentication section 173, the control section 171 ascertains that a charge restart check command is included in an AC waveform of received AC power (step S204), and the voltage detection circuit 178 detects the voltage of the battery cell 160 (step S205). Further, the determination circuit 179 determines a detected battery voltage (step S206).

When the result of determination is 3.9V or less (YES in step S207), the determination circuit 179 sends a report indicating recharge to the control section 171 (step S208). The control section 171 received the report sends a recharge command by way of the authentication section 172 and the modulation section 173 (step S209). Upon receipt of the command, the contactless charger 200 shifts to a transfer mode (step S210).

In the meantime, when the result of determination rendered by the determination circuit 179 in step S207 is greater than 3.9V (NO; step S207), the determination circuit 179 sends a report indicating nonperformance of recharge to the control section 171 (step S211). Since the power supply from the coil 280 of the contactless charger 200 is interrupted, a decrease arises in electromotive force of the coil 177, and the power of the contactless charging circuit 170 is turned off (step S212).

FIG. 13 is a view showing that operation timing of the contactless charger 200 is conceptually denoted as H or L. An H period shows that the charger 200 is in the course of operation (any of operation for transferring a load check signal and checking load, authentication operation, power transfer operation, and charge restart check operation), and an L period represents stoppage of signal transfer operation and power transfer operation. A standby mode (a), an authentication mode (b), a transfer mode (c), and an error mode (e) are common to FIG. 6. In the present embodiment, a charge stop mode (d) is provided in lieu of the charge completion mode shown in FIG. 6.

In the charge stop mode (d) shown in FIG. 13, the period T6 of operation pertaining to the charge restart check command is set so as to become greater than the period T5 (=T1=T4) of operation of the load check signal. Accordingly, charge restart check is performed despite standby power that is essentially equal to power achieved in the standby mode, and performance of recharge is enabled. A duration Te of the operation time of the load check signal is set so as to become equal to other operation times Ta, Tc, and Td. As shown also in (S6) of FIG. 10, the present mode requires performance of a determination as to whether or not a recharge command is acquired from the mobile phone 100 after the contactless charger 200 has issued the charge restart check command. The operating state is continually held until the determination is completed, and hence the duration Tf of the operation time is comparatively large. In the present embodiment, the duration is set to a relationship of Ta<Tb<Tf.

Although specific examples pertaining to an operation interval and the duration of an operation time are provided below, they are not limited particularly to these numerals.

T1, T4, T5: 0.1 s (second)
T6: 100 s
Ta, Tc, Td: 0.01 s
Tf: 0.05 s

When power consumption achieved at the time of operation of the contactless charger 200 is 1 W and when power consumption achieved when operation of the charger is stopped is 0.01 W, power consumption achieved in a standby mode is found to be 0.1090 W, and power consumption achieved in a charge stop mode is found to be 0.1094 W in terms of an average per hour. Even when the charge stop mode is adopted, power consumption can be understood to be reduced to a level essential equal to that achieved merely in the standby mode.

According to the second embodiment of the present invention, the load check signal and the restart check command are intermittently generated and transmitted in a charge stop mode that is a charge stop state. Accordingly, there are provided a contactless charging system that enables automatic recharge and provides much enhanced usability in addition to yielding the advantage of the first embodiment and a contactless charger and an electronic device which are applied to the system.

Third Embodiment

Figure 14:
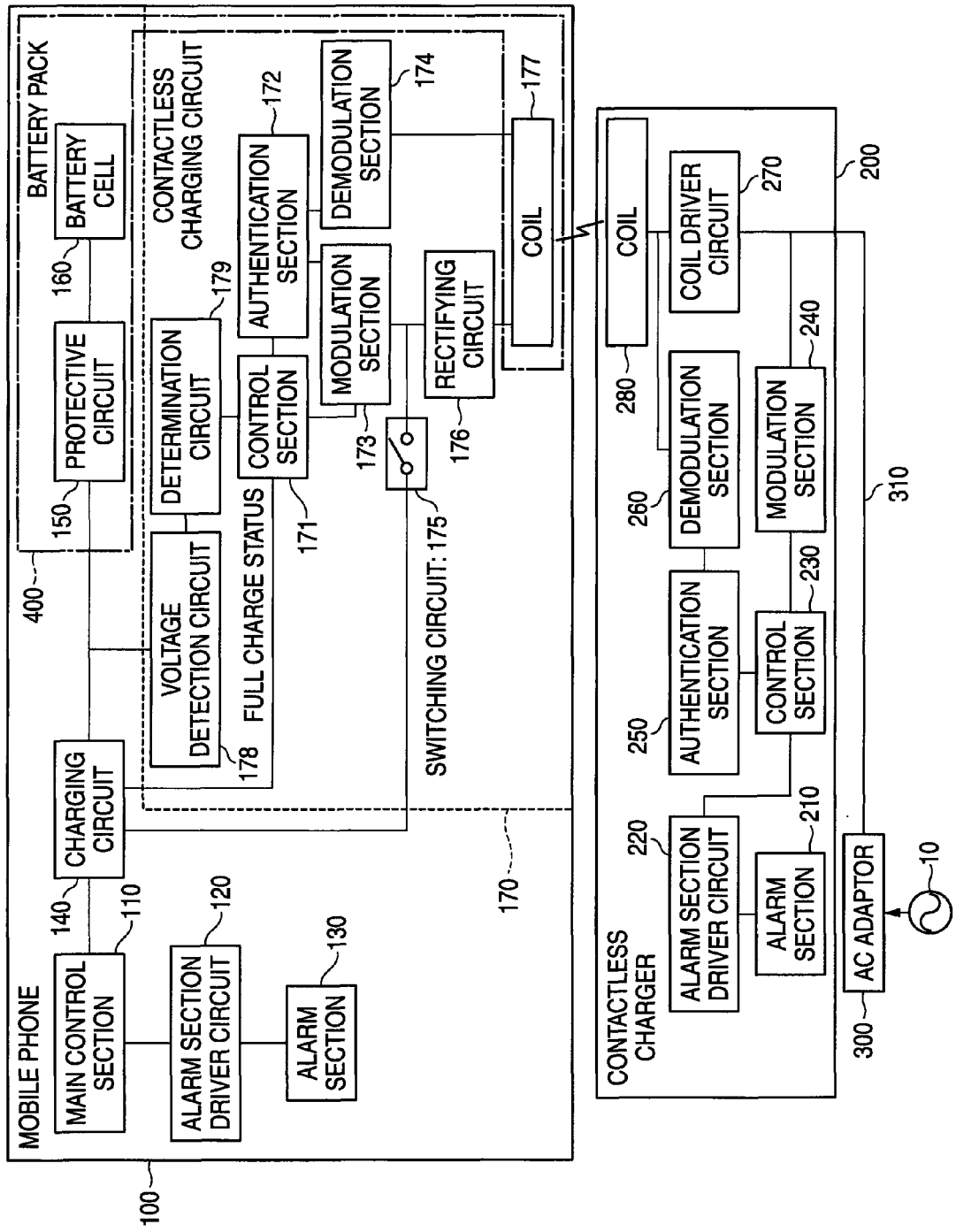
FIG. 14 is a block diagram for describing an overview of a contactless charging system of a third embodiment of the present invention.

FIG. 14 is a block diagram for describing the overview of a contactless charging system of a third embodiment of the present invention. As shown in FIG. 14, in the present embodiment, the mobile phone 100 in the contactless charging system of the second embodiment is independently provided with a battery pack 400 including the coil 177, the protective circuit 150, and the battery cell 160. The battery pack 400 is configured so as to be removable from a main unit that is the other portion of the mobile phone 100 and independently tradable.

Figure 15:
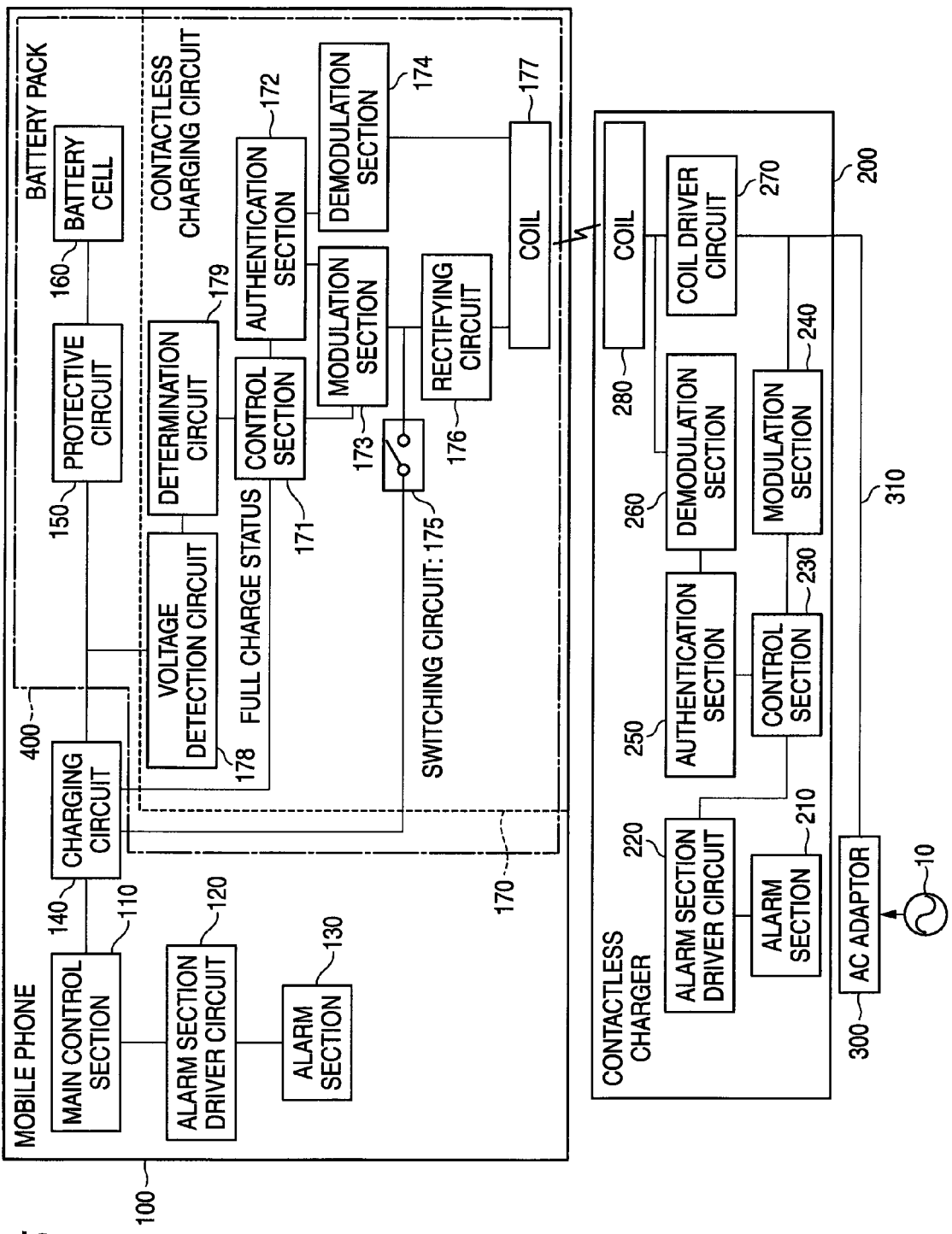
FIG. 15 is a block diagram for describing a modification of the contactless charging system shown in FIG. 14.

FIG. 15 is a modification of the contactless charging system shown in FIG. 14. As shown in FIG. 15, in the present embodiment the mobile phone 100 of the contactless charging system of the second embodiment is independently provided with the battery pack 400 that includes the overall contactless charging circuit 170, the protective circuit 150, and the battery cell 160. The battery pack 400 of the present embodiment includes the principal feature of the present invention and is configured so as to be removable from the main body that is the other part of the mobile phone 100 and independently tradable.

Although various embodiments of the present invention have been described, the present invention is not limited to the matters provided in the embodiments. Alterations and applications, which would be conceived by those skilled in the art on the basis of the descriptions of the specification and well-known techniques, are also intended by the present invention and fall within a scope for which protection is sought.

INDUSTRIAL APPLICABILITY

The battery pack, the electronic device, the contactless charger, and the contactless charging system of the present invention provide superior usability; allow for a reduction in power consumption and a safety measure; and are useful for recharging various electronic devices, such as mobile phones.

The invention claimed is:

1. A contactless charger for charging, in a contactless manner, an electronic device using a secondary battery as a power source, the charger comprising:
   a transceiving section configured to receives from the electronic device a full charge command indicating completion of recharging,
   wherein the charger shifts,
   upon receipt of the full charge command, to a charge stop state in which charging of the electronic device is not performed,
   wherein the transceiving section is further configured to intermittently transmit, in the charge stop state, a load check signal for checking whether or not the electronic device is placed on the contactless charger in a rechargeable manner,
   wherein the transceiving section is further configured to intermittently transmit, in the charge stop state, a charge restart check command for checking whether or not the electronic device requires recharging,
   wherein the transceiving section is capable of transmitting the load check signal separately from the charge restart check command, and
   wherein time intervals at which the charge restart check command is transmitted are larger than time intervals at which the load check signal is transmitted.

2. The contactless charger according to claim 1, wherein when it is ascertained by the load check signal that the electronic device is placed, the control section maintains the contactless charger in a charge stop state, and
   when it is ascertained by the load check signal that the electronic device is not placed, the control section shifts the contactless charger to an initial state achieved immediately after activation of a power source.

3. The contactless charger according to claim 1, wherein the transceiving section includes a coil that transmits power for recharging the electronic device; and the contactless charger further comprises a modulation section that superimposes the load check signal and the charge restart check command on power and that modulates the power.

4. The contactless charger according to claim 1, wherein the transceiving section includes a coil that transmits power for recharging the electronic device; and the control section determines, based on a phase change in an electric current developing in the coil, that the electronic device is placed.

5. The contactless charger according to claim 1, wherein the transceiving section includes a coil for transmitting power for charging the electronic device.

6. An electronic device that uses as a power source a secondary battery which can be charged by the contactless charger according to claim 1.

7. The electronic device according to claim 6, further comprising:
   a control section that generates a full charge command configured to cause the contactless charger to shift to a charge stop state in which charging of the electronic device is not performed in response to completion of charge of the secondary battery; and
   a transceiving section for transmitting the full charge command to the contactless charger,
   wherein, when the transceiving section of the electronic device receives from the contactless charger the charge restart check command for checking whether or not the electronic device requests recharge in the charge stop state, the control section checks whether or not the secondary battery requests recharge; and, when the recharge is requested, the control section generates a recharge command indicating a request for recharge, and the transceiving section of the electronic device transmits the recharge command to the contactless charger.

8. An electronic device according to claim 6, wherein the transceiving section includes a coil that receives from the contactless charger power for charging the secondary battery; and the electronic device further comprises a modulation section that superimposes the full charge command and the recharge command on an electric current generated by the electronic device and that modulates the electric current.

9. The electronic device according to claim 8, wherein the modulation section differentiates the full charge command and the recharge command in terms of a difference in data sequence.

10. A contactless charging system including an electronic device and a contactless charger for charging the electronic device in a contactless fashion, wherein
the electronic device transmits a full charge command indicating that charge of the electronic device is completed;
the contactless charger configured to shift to a charge stop state in which charge of the electronic device is not performed, upon receipt of the full charge command;
the contactless charger configured to (1) intermittently generate, in the charge stop state, a load check signal for checking whether or not the electronic device is placed on the contactless charger in a state where the electronic device can be recharged, and (2) transmit the load check signal;
the contactless charger further configured to (1) generate, in the charge stop state, a charge restart check command for checking whether or not the electronic device requests recharge, and (2) transmit the charge restart check command separate from the load check signal; wherein
the contactless charger shifts to a power transfer state when it receives a recharge command indicating that the electronic device requests recharge in response to the charge restart check command, and remains in a charge stop state when it does not receive the recharge command in response to the charge restart check command; and
wherein time intervals at which the charge restart check command is generated are larger than time intervals at which the load check signal is generated.

11. The contactless charger of claim 1, further comprising:
a modulation section configured to modulate a carrier wave with a load check signal modulated carrier or a charge restart check command modulated carrier; and
a control section configured to intermittently generate, in a charge stop state, the load check signal for checking whether or not the electronic device is on the contactless charger in a rechargeable manner.

12. The contactless charger of claim 11, wherein the transceiving section is configured to transmit the load check signal modulated carrier separately from the charge restart check command modulated carrier, and
wherein time intervals at which the charge restart check command modulated carrier is transmitted are larger than time intervals at which the load check signal modulated carrier is transmitted.

* * * * *